(12) United States Patent
Brown et al.

(10) Patent No.: US 12,356,030 B2
(45) Date of Patent: Jul. 8, 2025

(54) METHODS FOR MEDIA PLAYBACK ERROR DETECTION AND ERROR MITIGATION

(71) Applicant: Mux, Inc., San Francisco, CA (US)

(72) Inventors: Adam Brown, Orinda, CA (US); Christian Pillsbury, Los Angeles, CA (US); Dylan Jhaveri, San Diego, CA (US); George Katsevman, Chestnut Hill, MA (US)

(73) Assignee: Mux, Inc., San Francisco, CA (US)

( * ) Notice: Subject to any disclaimer, the term of this patent is extended or adjusted under 35 U.S.C. 154(b) by 0 days.

(21) Appl. No.: 18/386,947

(22) Filed: Nov. 3, 2023

(65) Prior Publication Data
US 2024/0155168 A1 May 9, 2024

Related U.S. Application Data

(60) Provisional application No. 63/422,372, filed on Nov. 3, 2022.

(51) Int. Cl.
H04N 21/24 (2011.01)
H04N 21/2343 (2011.01)
H04N 21/239 (2011.01)
H04N 21/258 (2011.01)
H04N 21/845 (2011.01)

(52) U.S. Cl.
CPC . *H04N 21/2404* (2013.01); *H04N 21/234309* (2013.01); *H04N 21/2393* (2013.01); *H04N 21/25808* (2013.01); *H04N 21/8456* (2013.01)

(58) Field of Classification Search
CPC ....... H04N 21/2404; H04N 21/234309; H04N 21/2393; H04N 21/25808; H04N 21/8456
See application file for complete search history.

*Primary Examiner* — Anthony Bantamoi
(74) *Attorney, Agent, or Firm* — Run8 Patent Group, LLC; Peter Miller

(57) ABSTRACT

A method includes: accessing a set of errors occurring during playback of segments of a video in a first rendition within a device population during a first time period and, during a subsequent time period, in response to receiving a first request for a first segment of the video in the first rendition: deriving, from the set of errors, a first error rate associated with the first segment in the first rendition; and, in response to the first error rate falling below a threshold, serving the first segment. The method also includes, in response to receiving a second request for a second segment of the video in the first rendition: deriving, from the set of errors, a second error rate associated with the second segment in the first rendition; and in response to the second error rate exceeding the threshold, serving the second segment in a second rendition.

20 Claims, 5 Drawing Sheets

METHODS FOR MEDIA PLAYBACK ERROR DETECTION AND ERROR MITIGATION

CROSS-REFERENCE TO RELATED APPLICATIONS

This Application claims the benefit of U.S. Provisional Application No. 63/422,372, filed on 3 Nov. 2022, which is incorporated in its entirety by this reference.

This Application is also related to U.S. patent application Ser. No. 16/458,630, filed on 1 Jul. 2019, and U.S. patent application Ser. No. 17/737,748, filed on 5 May 2022, each of which is incorporated in its entirety by this reference.

TECHNICAL FIELD

This invention relates generally to the field of video players and more specifically to a new and useful method for video player video playback, error detection, and error notification in the field of video players.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
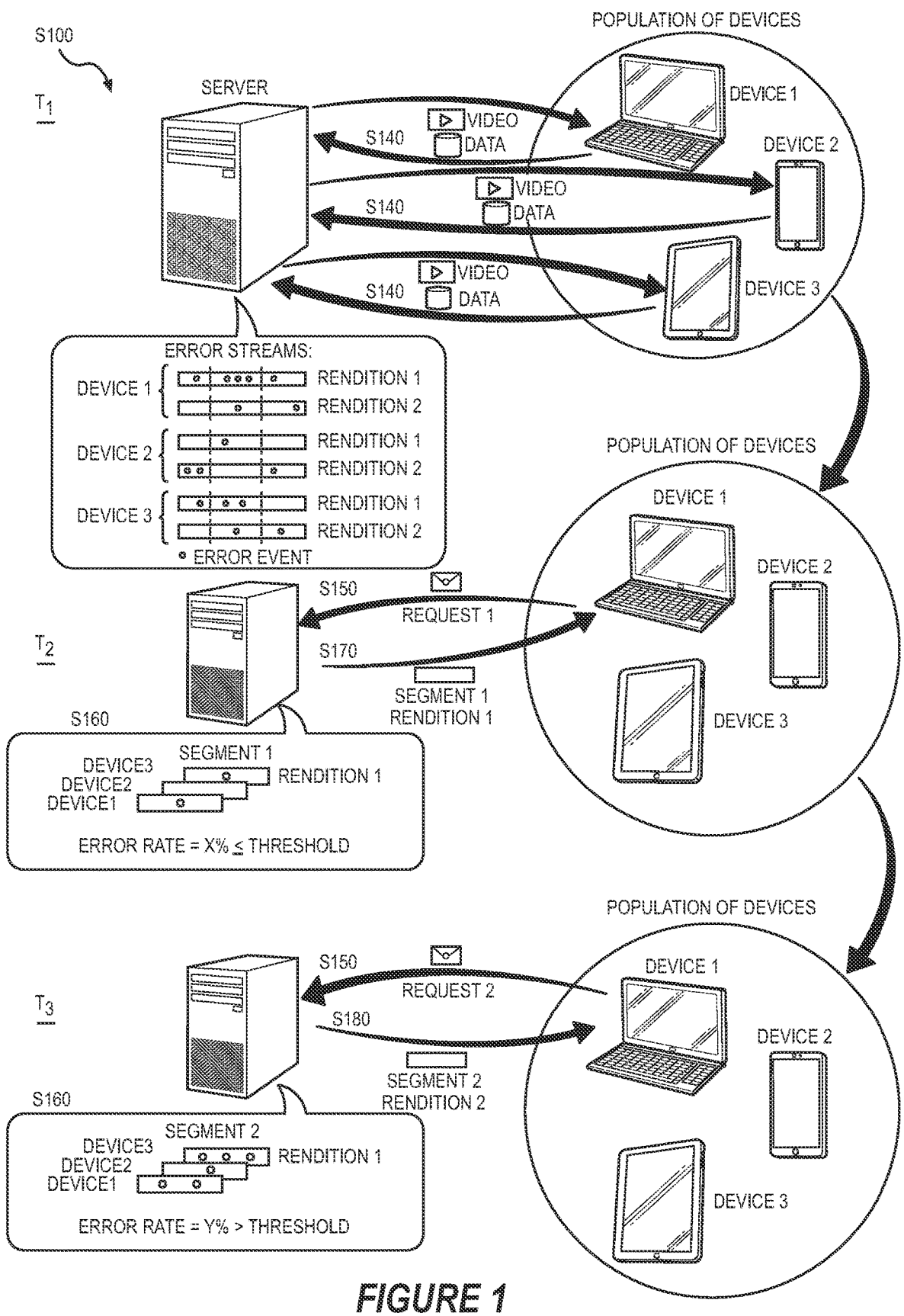
FIG. 1 is a schematic representation of a method.
Figure 2:
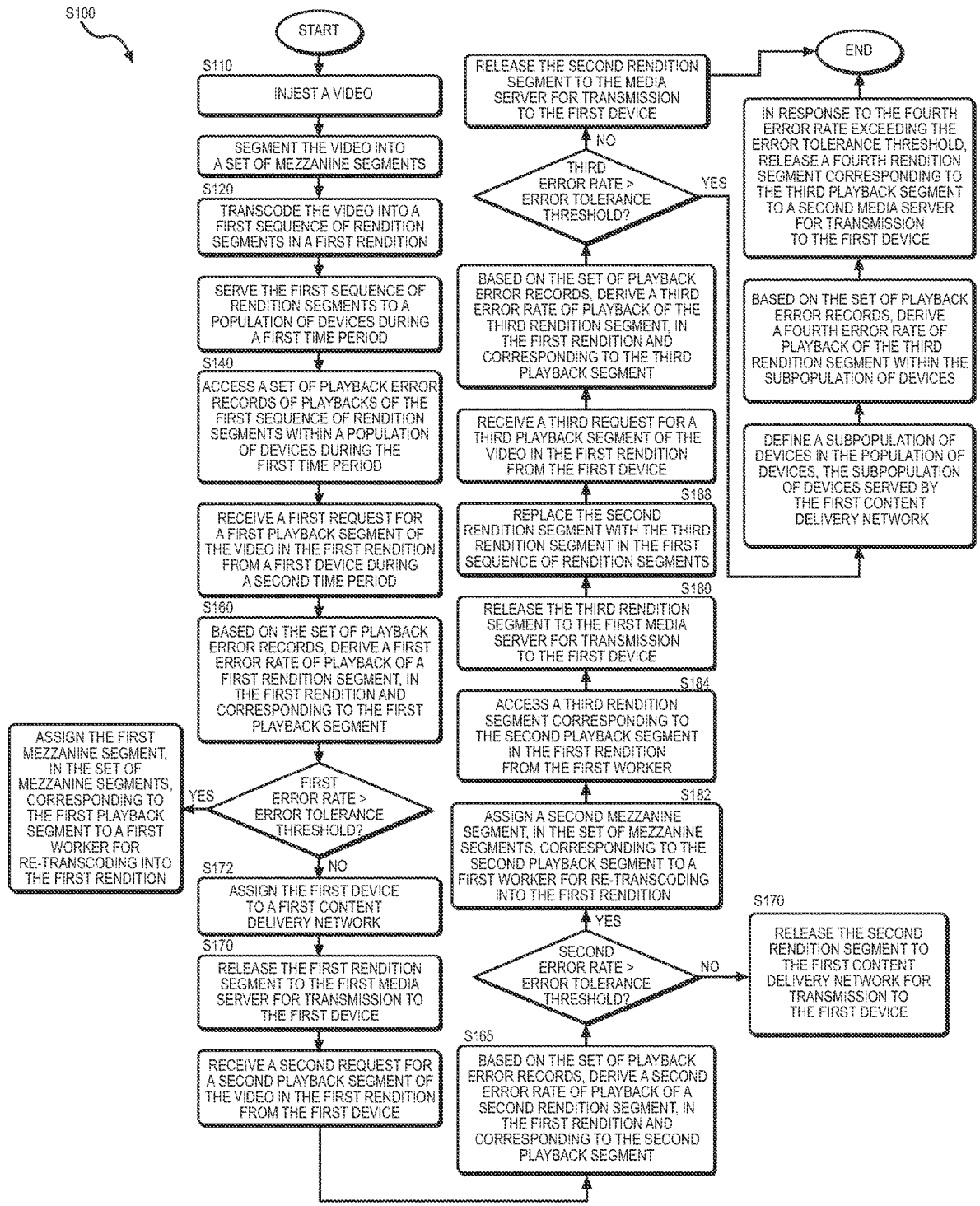
FIG. 2 is a flow diagram of one variation of the method.
Figure 3:
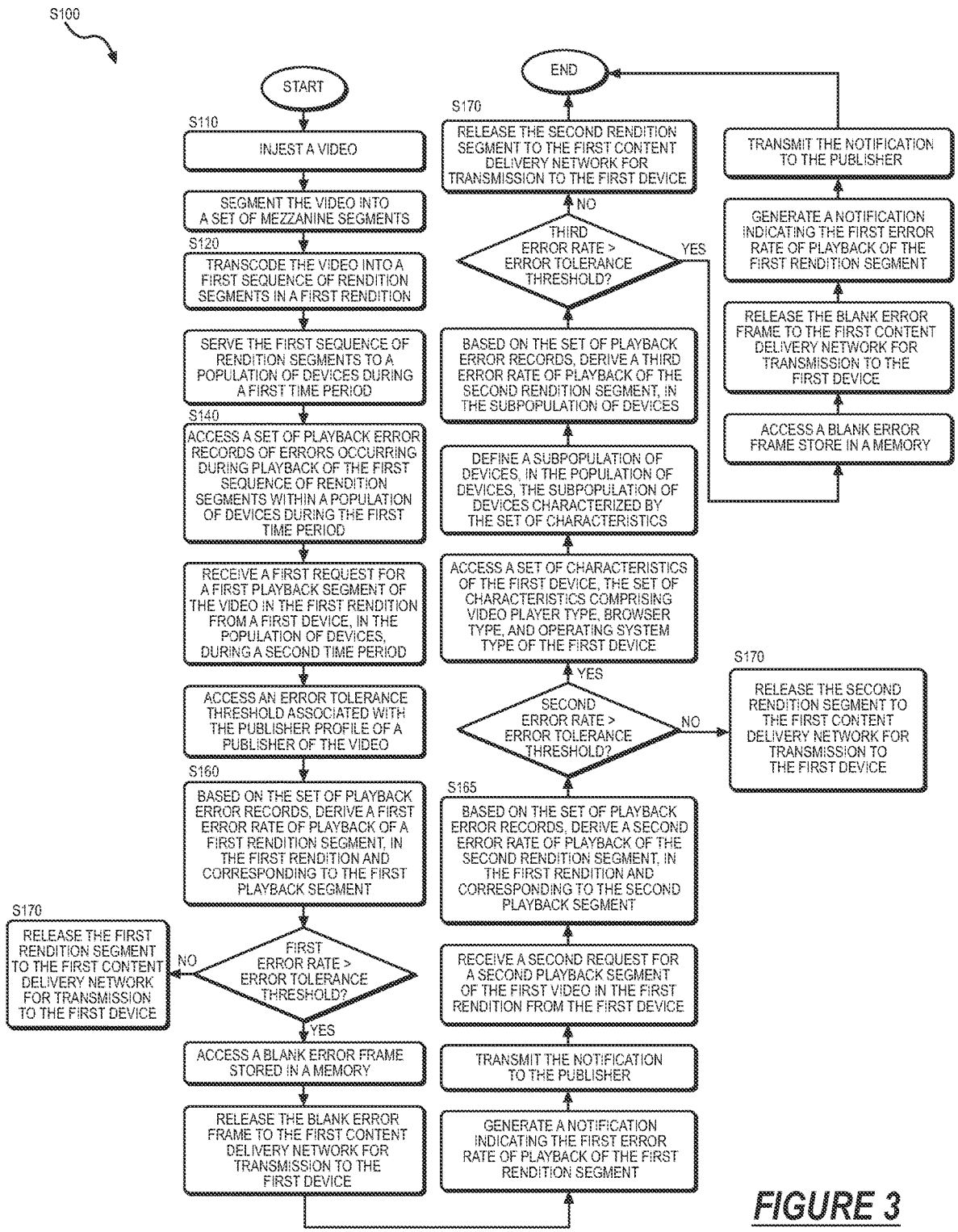
FIG. 3 is a flow diagram of one variation of the method.

As shown in FIG. 1, a method S100 for error detection and handling includes: ingesting a video in Block S110; transcoding the video into a first sequence of rendition segments in a first rendition characterized by a first resolution and a first bitrate in Block S120; transcoding the video into a second sequence of rendition segments in a second rendition characterized by a second resolution and a second bitrate in Block S130; and accessing a first set of error records of playbacks of the first sequence of rendition segments within a population of devices during a first time period in Block S140.

The method S100 also includes, during a second time period succeeding the first time period: receiving, from a first device, a first request for a first playback segment of the video in the first rendition; in response to receiving the first request, deriving, from the first set of error event records, a first error rate of playback of a first rendition segment, in the first rendition and corresponding to the first playback segment, within the population of devices during the first time period in Block S160; and, in response to the first error rate falling below a first error tolerance threshold, serving the first rendition segment to the first device in Block S170.

The method S100 also includes, during a second time period and, in response to receiving, from the first device, a second request for a second playback segment of the video in the first rendition: deriving, from the first set of error event records, a second error rate of playback of a second rendition segment, in the first rendition and corresponding to the second playback segment, within the population of devices during the first time period in Block S165; and, in response to the second error rate exceeding the first error tolerance threshold, serving a third rendition segment, in the second rendition and corresponding to the second playback segment, to the first device in Block S180.

1.1 Variation: Server-Side Error Detection and Mitigation

In one variation, the method S100 for error detection and handling includes: ingesting a video in Block S110; transcoding the video into a first sequence of rendition segments in a first rendition characterized by a first resolution and a first bitrate in Block S120; and accessing a first set of error records of playbacks of the first sequence of rendition segments within a population of devices during a first time period in Block S140.

In this variation, the method S100 also induces, during a second time period succeeding the first time period, and, in response to receiving, from a first device, a first request for a first playback segment of the video in the first: deriving, from the first set of error event records, a first error rate of playback of a first rendition segment, in the first rendition and corresponding to the first playback segment, within the population of devices during the first time period in Block S160; and, in response to the first error rate falling below a first error tolerance threshold, assigning the first device to a first media server in Block S172 and releasing the first rendition segment the first media server for transmission to the first device in Block S170.

In this variation, the method S100 also includes, during the second time period and, in response to receiving, from the first device, a second request for a second playback segment of the video in the first rendition: deriving, from the first set of error event records, a second error rate of playback of a second rendition segment, in the first rendition and corresponding to the second playback segment, within the population of devices during the first time period in Block S165; and, in response to the second error rate exceeding the first error tolerance threshold, assigning the second playback segment to a first worker for re-transcoding into the first rendition in Block S182, accessing a third rendition segment corresponding to the second playback segment in the first rendition from the first worker in Block S184, releasing the third rendition segment to the first media server for transmission to the first device in Block S180, and replacing the first rendition segment with the third rendition segment in the first sequence of rendition segments in Block S188.

1.2 Variation: Media Server-Side Error Detection and Mitigation

In one variation, the method S100 for error detection and handling includes, during a second time period and in response to receiving, from a first device, a first request for a first playback segment of a video in a first rendition: accessing a first set of error records of playbacks of a first rendition segment corresponding to the first playback segment in the first rendition within a population of devices during a first time period preceding the second time period in Block S140; deriving, from the first set of error event records, a first error rate of playback of the first rendition segment in Block S160; and, in response to the first error rate falling below a first error tolerance threshold, serving the first rendition segment to the first device in Block S170.

In this variation, the method S100 also includes, during the second time period and, in response to receiving, from the first device, a second request for a second playback segment of the video in the first rendition: accessing a second set of error records of playbacks of a second rendition segment corresponding to the second playback segment in the first rendition within the population of devices during the first time period in Block S140; deriving, from the second set of error event records, a second error rate of playback of the second rendition segment in Block S165; and, in response to the second error rate exceeding the first error tolerance threshold, accessing a third rendition segment, corresponding to the second playback segment, in a second rendition from a server in Block S184 and serving the third rendition segment to the first device in Block S180.

1.3 Variation: Error Domain Classification

Figure 4:
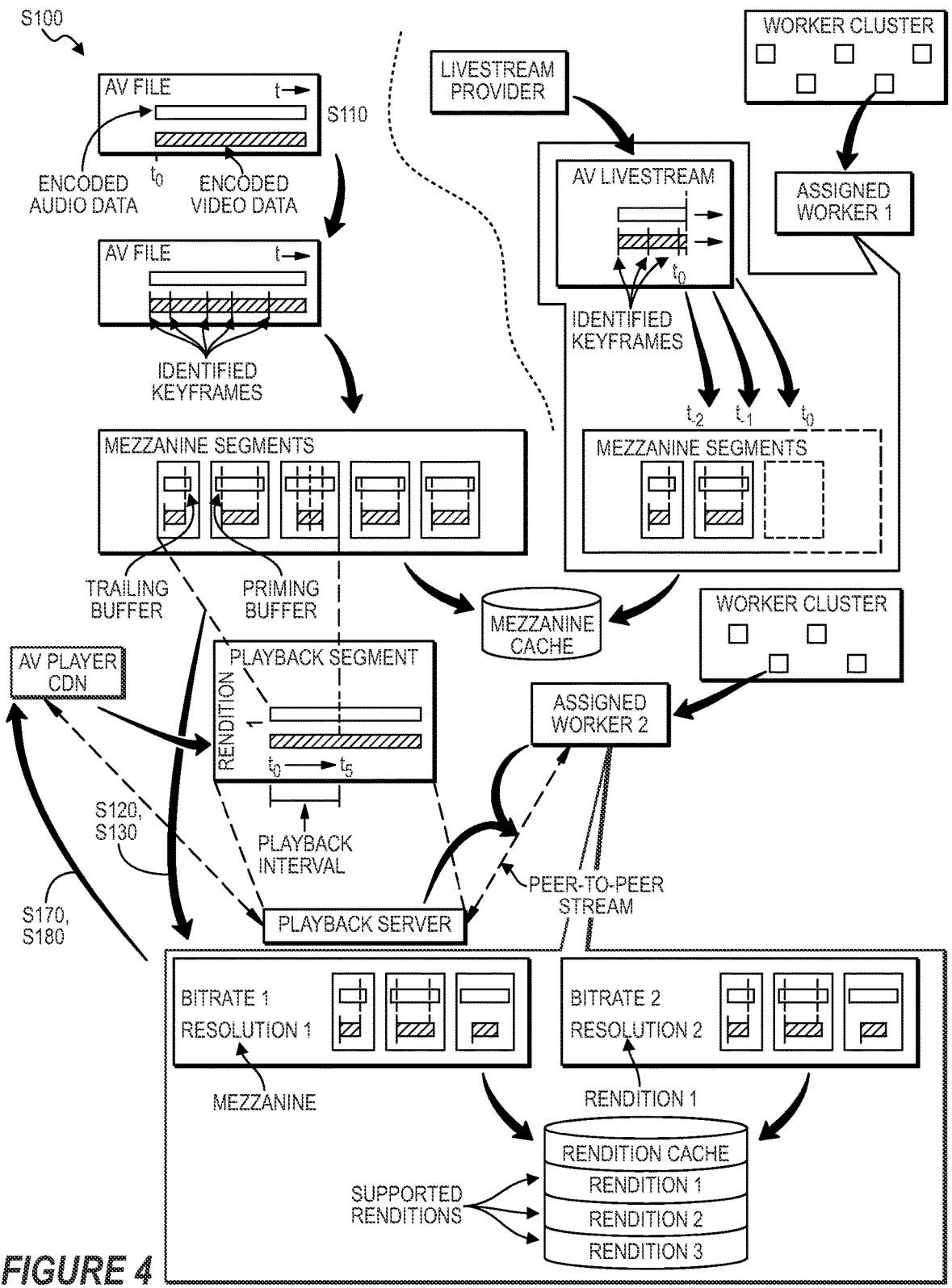
FIG. 4 is a schematic representation of one variation of the method.
Figure 5:
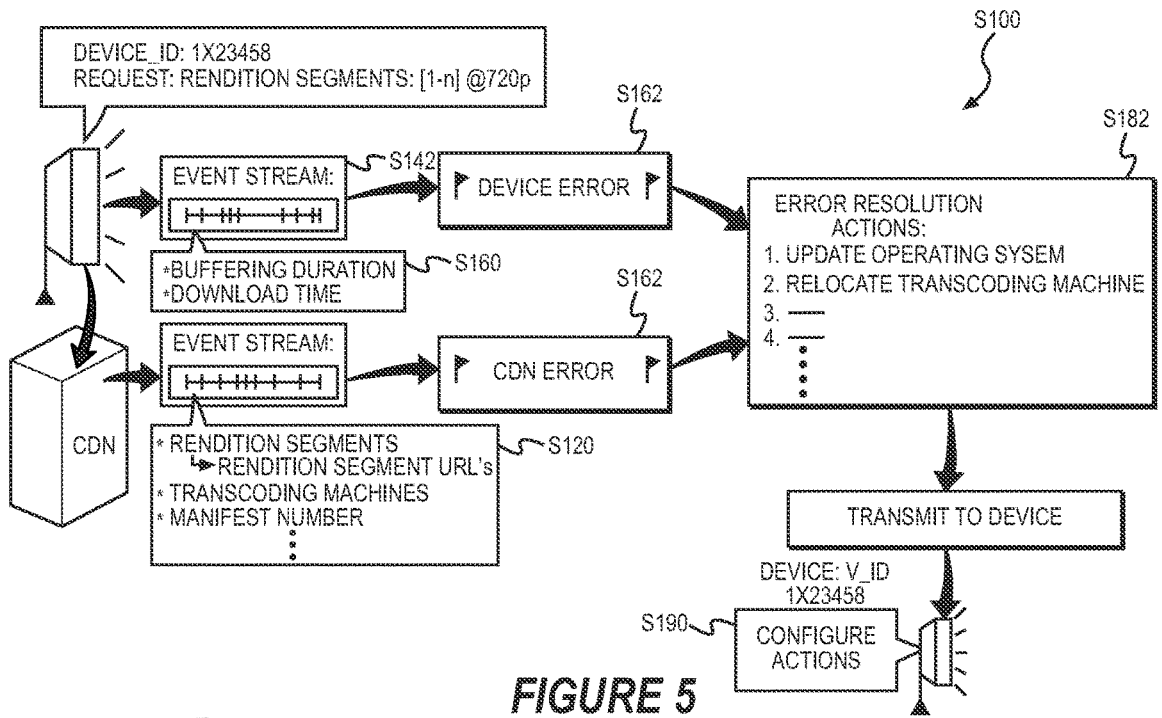
FIG. 5 is a schematic representation of one variation of the method.
Figure 6:
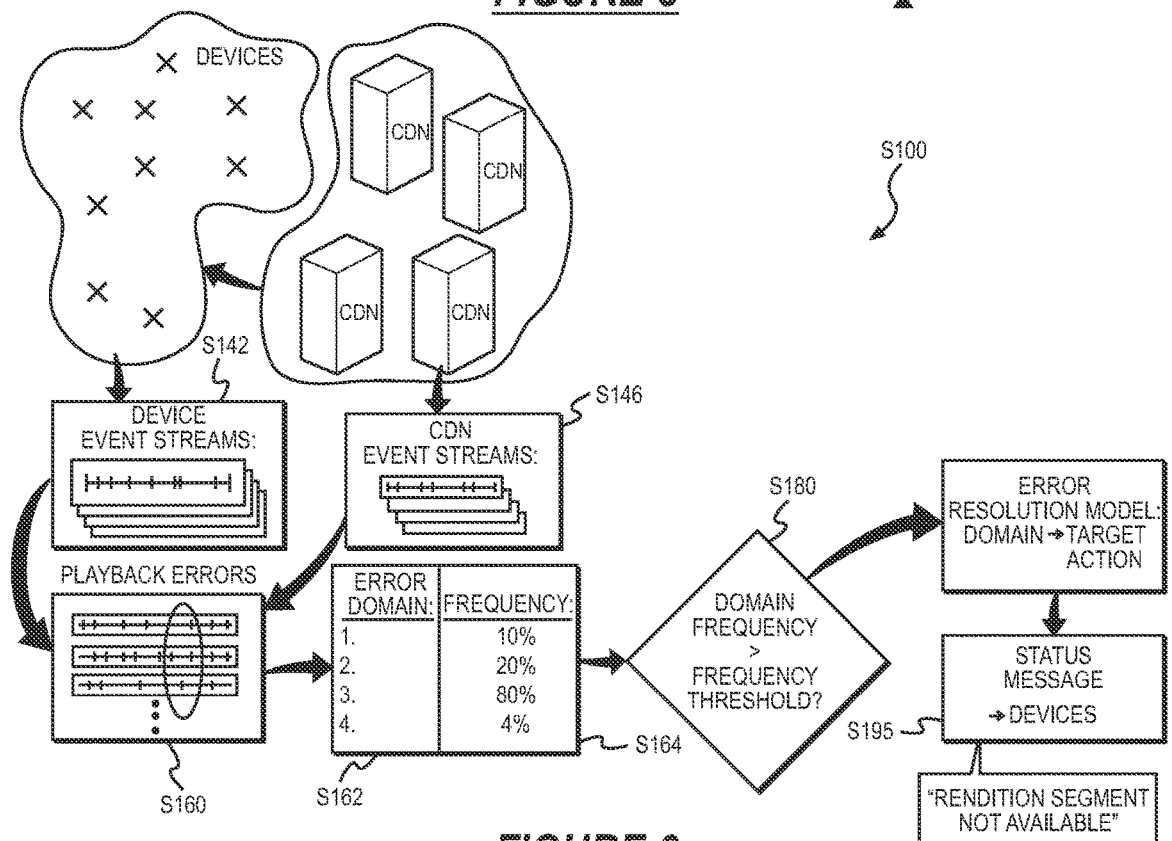
FIG. 6 is a schematic representation of one variation of the method.

As shown in FIGS. 4, a method S100 for video player video playback and error handling includes: during a first time period, receiving a first playback request for video content in a target rendition from a first device associated with a unique identifier in Block S150; for the first device, upon initiating playback of the video content, recording a device event stream for the video playback characteristic of a sequence of playback events occurring during the video playback, and a frequency of each playback event in Block S142; for a first media server associated with the first device based on a device address, recording a media server event stream for the video playback characteristic of a sequence of media server events occurring during the video playback, and a frequency of each media server event in Block S146; extracting features from the device event stream and the media server event stream to detect a set of playback errors in Block S160; classifying each playback error in the set of playback errors as deriving from a device-side error or a media server-side error in Block S162; defining a set of error resolution actions for the playback error in Block S180; and delivering the set of error resolution actions to a user for selection of a target error resolution action based on a set of user preferences specific to the user associated with the device in Block S190.

The method S100 further includes, during a second time, accessing event streams associated with a set of video playbacks for a population of devices in Block S142; accessing event streams associated with the set of video playbacks for a population of media servers corresponding to the population of devices in Block S146; detecting a set of playback errors for a subpopulation of devices based on the event streams in Block S160; classifying each playback error into an error domain based on a set of characteristics descriptive of the playback error in Block S162; computing a domain failure rate for each error domain in Block S164; in response to detecting the domain failure rate for a domain exceeding a domain failure threshold, performing an error resolution action based on the domain type and the error resolution model in Block S180 and transmitting a status message to the device descriptive of the playback error and a playback error source in Block S195.

2. Applications

In one variation, the method S100 is executed by a computer system in cooperation with a set of content distribution networks (hereinafter "media servers") that access databases containing video segments transcoded into target renditions and catalogued by a set of URL addresses. In particular, a media server distributes digital content (e.g., including digital video segments) to internet users via devices. The computer system can be configured to access, receive, ingest, configure, and/or store video content, such as rendition segments of digital videos. Furthermore, instances of a video player function to stream video content and enable users to adjust playback of the video content via playback controls, such as play, pause, stop, fast forward etc.

In one implementation, for video playback by an instance of the video player, the computer system can: access event streams descriptive of device-side and media server-side events during the video playback characteristic of device performance, and media server performance; detect a playback error during the video playback based on these event streams; classify the playback error type based on an error source and/or other data contained in the event streams; and define a set of error resolution actions in response to the playback error based on the error source. For example, in response to receiving a playback request for video content (e.g., a set of rendition segments in a target rendition) from a first endpoint device during a first time period, the computer system can record a device event stream representing a sequence of playback events occurring during the video playback by the video player at the device, such as: a rendition segment download commencement time; a rendition segment download completion time; a buffering duration; and a change in rendition during playback. The computer system can then derive metrics for these playback events (e.g., frequency of each type of playback event).

In this example, the computer system can also receive a media server event stream—from a particular media server serving the video content to the first endpoint device—based on an address (e.g., an IP address) of the first endpoint device. In this example, the computer system can populate the media server event stream with media server events occurring during video playback at the first endpoint device, such as: a target rendition; a set of rendition segments specified by the content request; a set of rendition segment addresses or URLs; a set of transcoding machines specified by a make, a model, and/or an identifier for the transcoding machine; and/or a publisher associated with a manifest. Furthermore, the computer system can derive media server-related metrics, such as a frequency of each type of media server event occurring during the video playback by the video player at the first endpoint device.

The computer system can then detect playback errors at the device and/or the media server based on these event streams. In one implementation, the computer system can derive playback errors based on the event streams and classify the playback errors as originating from the device (hereinafter "device-side error") or from the media server (hereinafter "media server-side error") to identify a target error resolution action. For example, the computer system can extract features from the event streams to detect a playback error; classify the playback error as deriving from a device-side error or a media server-side error; and define a set of error resolution actions for the playback error. In this example, the computer system can aggregate a set of error resolution actions based on the error type and deliver the set of error resolution actions to a user for manual selection and configuration based on user preferences or automatically select the target error resolution action based on a target feature (e.g., lowest computational expenditure, fastest resolution time). Thus, the computer system can collect event streams, classify errors, and suggest error resolution actions for individual instances of video playback via the video player at the device. Therefore, the computer system can detect errors for multiple video player instances to generate an error resolution model and execute the error resolution model to resolve errors exhibiting similar characteristics across a population of devices.

Generally, in response to detecting a first instance of a playback error during the first period of time and identifying a target error resolution action, the computer system can identify playback errors across a population of devices and characterize status messages indicating the playback errors and error sources. For example, the computer system can access device and media server event streams associated with a set of video playbacks; detect a set of playback errors for a population of devices; classify each playback error into an error domain based on a set of characteristics descriptive of the playback error; compute a domain failure rate for each error domain; in response to detecting the domain failure rate for a domain exceeding a domain failure threshold, suggest or perform an error resolution action based on the domain type and the domain rate and stream a status message to the device descriptive of the playback error and a playback error source at the device. Therefore, the computer system can identify similarities in playback errors across video playbacks across a population of devices, classify playback errors based on the similarities, and notify the user of the device of the error type and reason for failure. Thus, the computer system can mainstream error detection and resolve playback errors en masse across a population of devices when the computer system detects similar playback errors at the population of devices.

Generally, the method S100 can be executed by a computer system to: receive a video from a publisher; transcode the video into rendition segments in various renditions, each rendition defined by a bitrate and a resolution; serve the rendition segments to user devices for playback; and collect playback error records of playbacks of these rendition segments within a population of user devices during a first time period. The method S100 can also be executed by a computer system to: receive, from a particular device, a request for a particular rendition segment, which corresponds to a particular playback segment (e.g., video segment) of the video transcoded into a particular rendition (e.g., bitrate and resolution); derive, from the playback error records, an error rate of the rendition segment; and, in response to the error rate falling below an error tolerance threshold, serve this rendition segment to the device.

The method S100 can also be executed by the computer system to: in response to the error rate exceeding the error tolerance threshold, mitigate possible future errors resulting from playback or distribution of the rendition segment by replacing the rendition segment with a substitute rendition segment generated by re-transcoding the corresponding mezzanine segment of the video. For example, in response to the error rate of the rendition segment exceeding the error tolerance threshold, the computer system can automatically: retrieve a mezzanine segment corresponding to this rendition segment; queue a machine to re-transcode the mezzanine segment in (near) real-time in the same bitrate and resolution as the failed rendition segment; and serve this re-transcoded rendition segment to the device. In another example, in response to the error rate exceeding the error tolerance threshold, the computer system can: identify a second rendition segment—corresponding to the same mezzanine segment of the video as the requested rendition segment but in a different rendition (e.g., a lower bitrate and or lower resolution)—previously transcoded and currently stored in a database; and serve this second rendition segment to the device in place of the rendition segment in the rendition originally requested by the device.

Accordingly, the method S100 can be executed by the computer system and media server: to characterize and track error rate of playback of individual rendition segments across a population of user devices; to preemptively re-transcode select rendition segments and/or revert to serving rendition segments in different renditions than requested in order to reduce playback error rate during playback of the video across the population of devices; and to thus improve playback quality of the video across this population of devices.

2.1 Inter-Network Error Management

Generally, the method S100 can be executed by a computer system: to receive a video from a publisher; to transcode the video into various renditions defined by a bitrate and a resolution; to serve the rendition segments to user devices for playback; and to collect playback error data of playback of these rendition segments within a population of user devices during a first time period. The method S100 can also be executed by a computer system to: receive, from a device, a request for a particular rendition segment, which corresponds to a playback segment of the video transcoded into a particular rendition (e.g., bitrate and resolution); derive, from the playback error data, an error rate of the rendition segment; and, in response to the error rate falling below an error tolerance threshold, serve this rendition segment to the device.

The method S100 can also be executed by the computer system to: detect that the error rate of playback of a rendition segment exceeds the error tolerance threshold; and mitigate possible errors resulting from playback or distribution of the rendition segment by replacing the rendition segment with a substitute rendition segment generated by re-transcoding the corresponding mezzanine segment of the video. For example, the computer system can: retrieve a mezzanine segment corresponding to this rendition segment; queue a machine to re-transcode the mezzanine segment in (near) real-time in the same bitrate and resolution as the failed rendition segment; and load this new rendition segment in a database for the media server to serve the re-transcoded rendition segment to the device. In another example, in response to the error rate exceeding the error tolerance threshold, the media server can: identify a second rendition segment—corresponding to the same mezzanine segment of the video as the requested rendition segment but in a different rendition (e.g., a lower bitrate and/or lower resolution)—previously transcoded and currently stored in a database; and serve this second rendition segment to the device in place of the rendition segment in the rendition originally requested by the device.

Accordingly, the method S100 can be executed by the computer system and media server to: characterize and track the error rate of playback of individual rendition segments across a population of user devices; preemptively re-transcode select rendition segments and/or revert to serving rendition segments in different renditions than requested in order to reduce playback error rate during playback of the video across the population of devices; and, thus, improve playback quality of the video across this population of devices.

2.2 Device-Specific Error Management

In another implementation, the method S100 can also be executed by a computer system and a media server to: access a first error rate of playback of a rendition segment within a subpopulation of devices characterized by a set of characteristics, such as video player type of the device, location of the device, operating system type of the device, etc.; access a second error rate of playback of the rendition segment within the population of devices; and, in response to the first error rate exceeding the error tolerance threshold and in response to the second error rate falling below the error tolerance threshold, serve the rendition segment to a first device included in the population of devices and excluded from the subpopulation of devices. The computer system can load a substitute rendition segment into a database accessible by a media server. The server can then access the rendition segment from the database and serve the substitute rendition segment to a second device within the subpopulation of devices.

Accordingly, the method S100 can be executed by the computer system and the media server to identify an increased error rate of playback of the rendition segment within the subpopulation of devices defined by a particular set of characteristics, such as video player type of the device. For example, the devices with a first video player type can exhibit increased error rate during playback of the rendition segment. The method S100 can then be executed to mitigate the increased error rate associated with the set of characteristics. Therefore, the method S100 enables classification of a possible cause of the increased error rate, such as the first video player lacking instructions to play the rendition segment.

2.3 Terms

Generally, the term "mezzanine," as used herein, refers to the highest quality (e.g., high bitrate and high resolution) encoding (i.e., a bitrate resolution pair) of a video (e.g., video file, audio-video file) cached by the computer system that derives from the original version of the video uploaded to the computer system. Therefore, a "mezzanine segment" refers to a segment of the video encoded at the highest quality encoding for the video.

Generally, the term "rendition" refers to any encoding of the video that is indicated in the rendition manifest or manifest file (e.g., an HLS manifest) for a stream of the video. Therefore, a "rendition segment" refers to a segment of the video that has been transcoded at a bitrate and/or resolution different from the mezzanine segment. The computer system can transcode any mezzanine segment into multiple corresponding rendition segments in various renditions representing the same time interval in the video at differing bitrates and resolutions.

Generally, the term "playback segment" refers to a segment requested by a media server or directly from a video player specifying a time interval in the video and a rendition of the video to be served by the computer system. Therefore, a playback segment coincides or corresponds to a mezzanine segment or rendition segment if a time interval defined by the playback segment temporally overlaps with the mezzanine segment or rendition segment in the video respectively. Additionally, or alternatively, the video player or media server can request a playback segment by specifying an index (e.g., a segment number) of a total number of playback segments in the video (e.g., based on a playback segment duration). Therefore, the computer system can calculate a playback interval in the video based on the index of the requested playback segment and a known (or specified) playback segment duration (e.g., 5 seconds).

Generally, the "computer system" can interface directly with a video player instance on a device (e.g., user device). Additionally, or alternatively, the computer system can release rendition segments of the video to a media server (e.g., content distribution network), which can distribute the rendition segments to the video player instance on the device.

3. Video Ingest and Transcoding

Blocks S110 and S120 of the method S100 recite: ingesting a video; transcoding the video into a first sequence of rendition segments in a first rendition characterized by a first resolution and a first bitrate; and transcoding the video into a second sequence of rendition segments in a second rendition characterized by a second resolution and a second bitrate.

Generally, in Blocks S110 and S120, the computer system can implement methods and techniques described in U.S. patent application Ser. No. 16/458,630 to: receive the video (e.g., audio-video file of the video) from a publisher of the video; and normalize a video into a mezzanine format defining the highest quality (e.g., highest available bitrate and highest available resolution) encoding of the video. The computer system can also: identify keyframes in the video; and segment the video based on the keyframes to generate the sequence of mezzanine segments.

In one implementation, the computer system can: publish a stream (e.g., an HLS stream) advertising renditions of the video prior to transcoding these renditions. For example, the computer system can generate a manifest file specifying each available rendition and, prior to transcoding the video into these renditions, publish the manifest file for access by a population of devices. The devices in the population of devices can then access the manifest file and request playback segments in renditions specified in the manifest file. In response to receiving a request for a playback segment of the video in a particular rendition from a device, in the population of devices, the computer system can transcode a mezzanine segment, corresponding to the playback segment, into a rendition segment in the requested rendition.

In particular, in response to receiving the request for the playback segment from the device, the computer system: maps the playback segment to the corresponding rendition segment (or a set of rendition segments); and identifies whether a mezzanine segment (or a set of mezzanine segments), corresponding to the rendition segment (or a set of rendition segments), was previously transcoded and stored in memory, such as a database or a rendition cache, or is currently queued for transcoding into the requested rendition. If the mezzanine segment was previously transcoded into the corresponding rendition segment and stored in the memory, the computer system retrieves the rendition segment from the memory and instructs a media server to serve the corresponding rendition segment to the device. However, if the computer system has not yet transcoded the rendition segment, the computer system initiates a just-in-time transcoding to: concurrently transcode the mezzanine segment, corresponding to the requested playback segment, into a corresponding rendition segment; instruct the media server to stream the corresponding rendition segment to the requesting device; and store the rendition segment in the memory for future distribution.

In another implementation, the computer system can transcode the series of mezzanine segments into a series of rendition segments in a first rendition, in a set of available renditions, prior to receiving requests for playback segments of the video. In this implementation, the computer system can, for each rendition in the set of available renditions: transcode the series of mezzanine segments into a series of rendition segments in the rendition; and store the series of rendition segments in the memory, such as a database or a rendition cache. Then, the computer system can: generate a manifest file representing each series of rendition segments corresponding to each rendition in the series of available renditions; and publish the manifest file for access via a population of devices. The devices in the population of devices can then access the manifest file and request rendition segments specified in the manifest file. In response to receiving a request for a rendition segment in the first sequence of rendition segments from a device, in the population of devices, the computer system can: access the rendition segment in memory; and instruct the media server to serve the corresponding rendition segment to the requesting device.

4. Content Distribution

Generally, during a first time period, the computer system and a set of media servers can cooperate to distribute sequences of rendition segments of the video in various renditions to the population of devices. For example, at a first time, the computer system can: receive a first request for a first playback segment of the video in a first rendition; in response to receiving the first request, access in the memory or transcode from a first mezzanine segment, a first rendition segment, which corresponds to the first playback segment, in the first rendition; and instruct a first media server, in a set of media servers, to serve the first rendition segment to the first device. Then, the first media server can serve the first rendition segment to the first device. For example, the computer system can generate a resource locator for the first rendition segment and release the resource locator to the first media server. The first media server can then transmit a first resource locator of the first rendition segment to an instance of the video player running on the first device. In this example, at a second time, the computer system can: receive a second request for a second playback segment of the video in a first rendition; in response to receiving the second request, access from the memory or transcode from a second set of mezzanine segments, a second set of rendition segments, corresponding to the second playback segment, in the first rendition; and instruct a second media server in the set of media servers, to serve the second set of rendition segments to the second device. Then, upon receiving the instructions, the second media server can serve the second set of rendition segments to the second device. Therefore, during the first time period, the computer system and the media server can distribute the rendition segments of the video in various renditions to the population of devices.

5. Accessing Playback Error Records

Block S140 of the method S100 recites: accessing a first set of error records of playbacks of the first sequence of rendition segments within a population of devices during a first time period. Generally, in Block S140, the computer system and/or the media server can access a set of historical error data (e.g., first set of error records), of the first sequence of rendition segments in the first rendition, recorded within the population of devices during the first time period. Therefore, the computer system and/or the media server can: collect error data (i.e., error event records) from the video players; and aggregate the error data to enable error detection of errors occurring during playback of the video within the population of devices.

5.1 Example: Error Event Record Aggregation

In one implementation, the computer system can receive error data, such as the first set of error event records, from a video player of a device, in the population of devices, and/or from a media server servicing the population of devices. In one example, the computer system can receive, from a video player of a device in the population of devices, a set of playback error records including buffering events, playback latency increase events, dropped frame events, etc. In another example, the computer system can receive, from a media server, a set of playback error records including a set of rendition segment playback requests received at the media server from the population of devices. During the first time period, the computer system can aggregate the set of playback errors received from multiple media servers and received from each player in the population of devices.

In one implementation, the computer system can access the first set of error records of playbacks of the first sequence of rendition segments within a population of devices during the first time period by accessing, from a video player of each device in the population of devices, a playback error event stream including a sequence of playback errors occurring during playback of the first sequence of rendition segments recorded by the player; and aggregating each playback error stream into the first set of error event records. For example, the playback error stream can include a timeseries of playback events such as buffering events, playback latency increase events, dropped frame events, and rendition change events, received from the video player of the device.

Therefore, the computer system can: receive, from each device in the population of devices, an error stream associated with the video and specifying playback events or errors occurring during playback of each rendition segment in the sequence of rendition segments; and aggregate these error streams into the first set of error event records.

In another implementation, the computer system can access the first set of error records of playbacks of first sequence of rendition segments within a population of devices during the first time period by: accessing (e.g., from a media server servicing each device in the population of devices) a playback error stream including a sequence of rendition segment playback requests for the first sequence of rendition segments; and aggregating the playback error streams into the first set of error event records.

Therefore, the computer system can: receive an error stream including a sequence of rendition segment playback requests for the first sequence of rendition segments, the sequence of rendition segment playback requests indicative of an error frequency of various errors occurring during playbacks of the first sequence of rendition segments. For example, the computer system can associate a first sequence of rendition segment playback requests received at irregular intervals with a higher error rate and associate a second sequence of rendition segment playback requests received at regular intervals with a lower error rate.

In another implementation, the a first media server can: access a first subset of playback error records of playbacks of the first rendition segment within a first population of devices served by the first media server during the first time period; access, from a second media server, a second subset of playback error records of playbacks of the first rendition segment within a second population of devices served by the second media server during the first time period; and aggregate the first subset of playback error records and the second subset of playback error records into the first set of playback error records. Additionally, or alternatively, the computer system can aggregate the first set of playback error records by accessing the first subset of playback error records from the first media server and accessing the second subset of playback error records from the second media server. Therefore, the computer system and/or the media server can aggregate the set of playback error records from a population of media servers enabling the computer system and/or the media server to derive a media-server specific error rate for the first rendition segment based on the first set of playback error records. For example, computer system and/or the media server can derive a first error rate for the first rendition segment served to the population of devices by a first media server and derive second error rate for the first rendition segment served to the population of devices by a second media server.

5.2 Device-Side Event Stream Capture

In one implementation, the computer system can capture or access an event stream associated with a video playback at a device in response to receiving a playback request for video content. More specifically, the computer system can receive a playback request from a device for video content (e.g., a set of rendition segments in a target rendition specified by a bitrate-resolution pair). In one variation, the computer system can receive a playback request for video content from a device associated with a unique identifier (as described in U.S. Provisional Application 63/403,196). The media server (e.g., content distribution network) can then retrieve the video content (e.g., a set rendition segment addresses corresponding to the set of requested rendition segments) and serve the video content to the device for playback at the device. During playback of the video content via a video player, the computer system can record a time series of events, such as: a buffering event start time; a buffering event end time; a fast-forward event; a pause event; a rewind event; a rendition segment download duration; and/or a change in rendition during playback. The computer system can also record a frequency of each event during the video playback and aggregate the time series of events into an event stream (e.g., a matrix) and associate the event stream with the playback request and the device. For example, the computer system can: during a first time period, receive a first playback request for video content in a target rendition from a device associated with a unique identifier; and, upon initiating playback of the video content at the device, record an event stream characteristic of a sequence of playback events occurring during the video playback, and associate the event stream with the playback request and device corresponding to the unique identifier. Thus, the computer system can capture an event stream descriptive of playback events and a frequency of the playback events corresponding to a playback request from a device for subsequent error detection and handling.

5.3 Media Server-Side Event Stream Capture

In one implementation, the computer system can capture an event stream associated with the video playback based on a media server associated with the device. More specifically, in response to receiving a playback request for the video content, the computer system can access a timeseries of media server events from a media server associated with a device corresponding to the unique identifier based on a device address (e.g., an IP address). In particular, the computer system can access the time series of media server events, such as: a rendition change event at a transcoding machine; a transcoding machine buffer; a transcoding event; and/or a manifest file error. In one variation, the computer system can access metadata associated with the media server corresponding to the content request, such as: a target rendition; a set of rendition segments specified by the content request; a set of rendition segment addresses (e.g., URLs); a set of transcoding machines (e.g., a make, a model, an identifier for the transcoding machine); and a publisher associated with a manifest. For example, the computer system can: during the first time period, receive the first playback request for video content in the target rendition from the device associated with the unique identifier; and, upon initiating playback of the video content at the device, record a media server event stream for the video playback characteristic of a sequence of media server events occurring during the video playback, and a frequency of each media server event during the video playback. Therefore, the computer system can access a media server-side event stream concurrently with the device-side event stream to correlate errors between the device and corresponding media server based on the device-specific address.

5.4 Device-Side Error Detection+Classification

Generally, the computer system can detect device-side playback errors based on the device event stream and correlate the playback errors to an error source. In one implementation, the computer system can detect a source of the playback error and classify the playback error as a device-side error or a media server-side error. More specifically, the computer system can detect device-side playback errors based on the device-side event stream, such as: a slow or lagging video playback; a discontinuous video playback; a blurry video playback; and a video playback failure. In one variation, the computer system can identify a device-side event, such as—a connection change at the device (e.g., from a wireless network protocol to a cellular network connection, offline device), an incompatible operating system, and a low-power operating state, etc. —causing the playback error. For example, the computer system can: access the device event stream for a video playback; extract a set of features from the device event stream; detect a first playback error based on the set of features; correlate the first playback error to an event associated with the device; and classify the first playback error as a device-side error. Therefore, the computer system can correlate playback errors to failures occurring locally on the device for subsequent investigation and recovery at the device by suggesting error-specific recovery actions (e.g., an operating system update) based on the error classification.

5.5 Media Server-Side Error Detection+Classification

In one implementation, the computer system can detect media server-side errors in the video playback based on the media server event stream for the device associated with the device address and classify the source of the error. More specifically, the computer system can detect media server-side playback errors based on events in the media server event stream, such as—a change in video playback resolution (e.g., a rendition), a video content URL error, a rendition segment transcoding error, etc. The computer system can then identify a media server-side event, such as: an incorrect rendition segment URL format; an unavailable rendition segment URL; a transcoder machine error; and/or a deleted manifest, causing the playback error. In response to identifying the media server-side event, the computer system can identify the media server causing the playback error based on the device address. For example, the computer system can: access the media server event stream for the video playback, extract the set of features from the media server event stream; detect a second playback error based on the set of features; correlate the second playback error with an error event at a media server; identify the media server associated with the second playback error and the error event based on a device address; and classify the second playback error as a media server-side error. Therefore, the computer system can correlate playback errors to failures occurring at a media server in communication with the device based on device addresses for subsequent investigation by suggesting media server-specific recovery actions based on the error classification.

6. Error Resolution Action Configuration+Selection

In one implementation, in response to detecting and classifying an error, the computer system can, predict and define a set of error resolution actions based on the error classification (e.g., device-side error, media server-side error). More specifically, responsive to detecting a device-side playback error, the computer system can predict a set of device error resolution actions, that can resolve the device-side playback error. For example, the computer system can predict device error resolution actions such as: updating a device operating system; restarting the device; reloading the video playback; and requesting a secondary content request. Additionally, or alternatively, responsive to detecting a media server-side playback error, the computer system can predict a set of media server error resolution actions, such as: reallocating a transcoding job to an alternate transcoding machine; selecting an alternate target rendition for the video playback; selecting an alternate rendition segment; and assigning an alternate media server to the device. The computer system can then transmit the set of error resolution actions to the device for selection or configuration by the user. For example, responsive to classifying the playback error, the computer system can: define a set of error resolution actions based on the playback error classification; and deliver the set of error resolution actions to the user associated with the device for selection of a target error resolution action based on a set of user preferences. Therefore, the computer system can transmit the set of error resolution actions to the user for configuration of a target error resolution action based on user-specific preferences (e.g., avoiding an operating system update, a target rendition preference, etc.).

In one implementation, the computer system and/or the media server can execute the user-selected error resolution action to identify whether the target error resolution action selected by the user based on user preferences resolves the playback error. For example, the computer system and/or the media server can: execute a first error resolution action selected by the user based on user preference, identify whether the first error resolution action resolves the playback error; in response to detecting error resolution failure, select a second error resolution action from the set of error resolution actions for execution; and, in response to the first error resolution action resolving the playback error, maintain the first error resolution action as a target error resolution action for the playback error. Thus, the computer system and/or the media server can execute the user-selected error resolution action each time the computer system detects a similar playback error during subsequent video playbacks and select an alternate error resolution action when the computer system does not resolve the playback error. Therefore, the computer system and/or the media server can execute various error resolution actions on playback errors, and record results of error resolution attempts for subsequent playback error resolution.

In one variation, the computer system can automatically select the target error resolution action for the playback error based on a target feature such as: a lowest computational cost; or a fastest playback error resolution time. For example, responsive to classifying the playback error, the computer system can: define a set of error resolution actions based on the playback error; and automatically select a target error resolution action based on a target feature for the device. Therefore, the computer system can reduce computational bandwidth in resolving playback errors by selecting a target error resolution action associated with a lower resource expenditure.

6.1 Error Resolution Model

Generally, the computer system can compute an error resolution model for subsequent error detection and resolution prediction based on error resolution instances. In one implementation, the computer system can generate a vector descriptive of the playback error and an associated error resolution action. More specifically, in response to identifying the target error resolution action for the playback error that resolved the playback error, the computer system can, generate an error resolution vector by aggregating a set of data descriptive of the error resolution instance, such as: the playback error; error classification (e.g., device-side, media server-side); the target error resolution action; the unique identifier associated with the device; a media server associated with the error; whether the error resolution action resolved the playback error; etc. The computer system can then aggregate sets of error resolution vectors for other error resolution instances to construct an error resolution model for subsequent instances of playback errors at other devices. In this implementation, the computer system can implement clustering techniques to identify similarities between playback errors (e.g., a set of video playbacks at a set of devices buffering at the same time due to an incompatible operating system, or a set of playback errors due to a corrupted manifest) and error resolution actions (e.g., trigger operating system update, or notify manifest publisher to reupload manifest). For example, in response to identifying a target error resolution action for the playback error, the computer system can: generate an error resolution vector for the error resolution instance by aggregating a set of data descriptive of the error resolution instance; generate an error resolution model by aggregating error resolution vectors for a set of error resolution instances; and, in response to detecting a second playback error, identify a second target error resolution action for the second playback error based on the error resolution model. Therefore, the computer system can generate the error resolution model to predict target error resolution actions for subsequent playback errors based on previously detected errors and instances of error resolution.

6.2 Error Resolution Model Update

In one implementation, the computer system can update the error resolution model in response to detecting error resolution failure based on a first target error resolution action at a first device. For example, during a subsequent instance of the video player at the device, the computer system can: detect a playback error at the device; automatically execute the target error resolution action based on the error resolution model; in response to detecting failure of error resolution of the playback error based on the target resolution action, execute a second error resolution action to resolve the playback error; select the second error resolution action as the target error resolution action; and update the error resolution model. Therefore, the computer system can update the error resolution model in response to detecting error resolution failures based on an initial target resolution action (e.g., configured by a user), thereby maintaining an accurate error resolution model for subsequent instances of the video player and playback errors.

7. Deriving Error Rate

Block S160 of the method S100 recites, during a second time period succeeding the first time period, deriving, from the first set of error event records, a first error rate of playback of a first rendition segment occurring within the population of devices during a first time period. Generally, in Block S160, the computer system and/or the media server can: derive from a first set of historical error data, collected during the first time period preceding the second time period within the population of devices, a historical error rate of playback of the first rendition segment in the first rendition.

Furthermore, during the second time period, the computer system (and/or the media server) can derive, from the first set of historical data, a historical error rate of playback of each rendition segment in the first sequence of rendition segments defined by the first rendition. In addition, during the second time period, the computer system (and/or the media server) can derive a historical error rate of playback of each rendition segment in a sequence of rendition segments defined by each rendition in the set of available renditions.

In one implementation, the computer system can derive the first error rate of playback of the first rendition segment within the population of devices in response to receiving a request, from a device, for the first rendition segment. In this implementation, in response to receiving the request, the computer system can trigger derivation of the first error rate for the first rendition segment.

In one implementation, the computer system can periodically derive an error rate of playback of each rendition segment in the first sequence of rendition segments. For example, the computer system can initiate a derivation of an error rate of playback of each rendition segment in the first sequence of rendition segments with a periodicity of every hour. In another example, the computer system can initiate derivation of an error rate of playback of each rendition segment in the first sequence of rendition segments in response to the view count of the video increasing by a threshold number of views. In another example, the computer system can initiate derivation of an error rate of playback of the first rendition segment in the first sequence of rendition segments in response to a quantity of requests for the first rendition segment increasing by a threshold number of views.

7.1 Example: Error Rate Derivation

In one implementation, the computer system can derive, from the first set of error event records, the first error rate of the first rendition segment within the population of devices by: deriving the first subset of error event records, in the first set of error event records, the first subset of error event records corresponding to the first playback segment within the population of devices during the first time period; and calculating a first error rate based on a quantity of errors in the first subset of error event records, duration of the first playback segment, and a quantity of devices in the population of devices.

Therefore, to derive an error rate associated with a rendition segment, the computer system can access a subset of errors occurring during the rendition segment within the population of devices and, based on this subset of errors, calculate the error rate associated with the rendition segment. Therefore, the computer system can calculate error rate associated with a rendition segment based on historic error data collected from the video player of each device in the population of devices.

Additionally, or alternatively, the computer system can also derive, from the first set of error event records, the first error rate of the first rendition segment within the population of devices by: deriving the first playback request interval associated with the first rendition segment from the first set of error event records, the first playback request interval defining an average interval between a request for the first rendition segment and a request for the subsequent rendition segment across the population of devices; and approximating a first error rate based on a first playback request interval. For example, the error rate can be proportional to the first playback request interval.

Therefore, to derive an error rate associated with a rendition segment, the computer system can: access a first average playback request interval defining an average interval between a request for the first rendition segment and a request for the subsequent rendition segment across the population of devices and approximating the first error rate for the rendition segment within the population of devices. Therefore, the computer system can calculate error rate for the rendition segment based on historic playback request data collected from a population of media servers serving the population of devices.

7.2 Population Data Access+Error Detection

In one implementation, the computer system can access video playbacks or streaming event data associated with a video playback across a population of devices during a time window. In this implementation, the computer system can detect playback errors in video playbacks across the population of devices during the time window. For example, during a second period of time, the computer system can access playback event streams (e.g., device-side event streams, media server-side event streams) for a set of video playbacks across a population of devices; and detect playback errors based on the event streams for the population of devices. Therefore, the computer system can identify similarities between playback errors across a population of devices to execute error resolution actions for similar playback errors at those devices, thereby reducing computational resources in resolving playback errors en masse.

7.3 Error Domain Classification

In one implementation, the computer system can classify playback errors into domains descriptive of the playback error similarity characteristic. More specifically, in response to detecting a playback error across a population of devices, the computer system can: classify the playback error into a set of error domains, such as an error time (e.g., 1:00 PMCT, 7:30 PM PT); a geographic region (e.g., a population of devices in a mall, on a beach, in a city), a manifest (e.g., a playback error specific to a particular manifest), a manifest publisher, a rendition (e.g., a population of devices unable to playback a particular rendition), and/or a transcoding machine (e.g., a particular transcoding machine failing to transcode video segments). The computer system can then execute error resolution actions on the playback errors across the population of devices exhibiting the playback errors based on the error resolution model to resolve the playback errors. For example, the computer system can: detect a set of playback errors in a population of devices; classify each playback error into an error domain based on a set of characteristics descriptive of the playback error; and identify similarities between playback errors across the population of devices based on the error domain. Thus, the computer system can cluster errors based on similar characteristics to mainstream error resolution across a population of devices exhibiting similar playback errors, thereby improving accuracy in en masse error resolution.

8. Error Threshold Selection

In one implementation, the computer system can define an error urgency based on an error rate threshold in each error domain. More specifically, the computer system can record an error rate (e.g., a percentage) for each error domain, such as: 75% for 150 playback errors in a geographic region out of 200 video playbacks; 66.7% for 1,000 playback errors at 3:00 PT out of 1,500 video playbacks associated with a video content; 62.5% for 500 playback errors associated with a rendition transcoding machine out of 800 video playbacks; and 15% for 15 playback errors associated with a manifest out of 100 video playbacks. The computer system can then define an error urgency level (e.g., priority) based on the error rate. For example, the computer system can: in response to classifying each playback error into the error domain for the population of devices; compute an error rate for each error domain; in response to the error rate exceeding an error rate threshold for the error domain, classify the playback error domain as "urgent," and prioritize resolution of the playback error across the population of devices characterized by the error domain; in response to the error rate falling below the error rate threshold for the error domain, deprioritize resolution of the playback error across the population of devices characterized by the error domain; and monitor for an increase in the error rate for the error domain.

In one variation, the computer system can select a target error resolution action based on the error domain and the error rate. For example, the computer system can: for a first playback error, classify the first playback error into a first error domain; compute a first error rate (e.g., 80%) for the first error domain; for a second playback error, classify the second playback error into a second error domain and compute a second error rate (e.g., 35%) for the second error domain; in response to the first error rate exceeding an first error rate threshold (e.g., 60%) for the first error domain, execute a first target error resolution action to resolve the first playback error across the population of devices; and, in response to the second error rate falling below a second error rate threshold (e.g., 55%) for the second error domain, withhold execution of a second target error resolution action until the second error rate exceeds the second error rate threshold to resolve the second playback error. Thus, the computer system can prioritize playback error resolution of playback errors across the population of devices when the computer system detects a threshold number of playback errors in a particular error domain during a time window and select a target error resolution action based on the error classification, thereby reducing computational load in resolving playback errors on a mass scale across a population of devices.

8.1 Example: Setting Error Tolerance Threshold

In one implementation, the computer system can set different error tolerance thresholds for different devices based on the characteristics of these devices, as devices with certain characteristics can exhibit error rates exceeding the error tolerance threshold during playback of certain rendition segments. For example, the computer system can set a first error tolerance threshold for a first device, in the population of devices, characterized by a first operating system, which is associated with elevated error rates. In this example, the computer system can also set a second error tolerance threshold for a second device, in the population of devices, characterized by a second operating system, which is correlated with lower error rates, the second error tolerance threshold exceeding the first error tolerance threshold.

In this implementation, in response to receiving, from a first device, the first request for the first playback segment in the first rendition, the computer system can: access a first characteristic of the first device; and select a first error tolerance threshold associated with the first characteristic in a table of error tolerance thresholds. In this implementation, in response to receiving, from a second device, in the population of devices, a second request for the first playback segment in the first rendition, the computer system can: access a second characteristic of the first device; and select a second error tolerance threshold associated with the second characteristic in the table of error thresholds. Therefore, the computer system can assign an error tolerance threshold to a device based on a set of characteristics, such as operating system type, video player type, browser type, and location, of the device thereby regulating the quality of the video playback at the device.

In another implementation, the computer system can set the error tolerance threshold for a video based on a publisher profile of the publisher of the video. For example, a first publisher may prioritize the reliability of video playback more than a second publisher. Accordingly, the computer system can assign a higher error tolerance threshold to videos of the first publisher than to videos of the second publisher. In this implementation, in response to receiving, from a first device, the first request for a first rendition segment, in the first sequence of renditions segments, the computer system can: access a first publisher profile associated with the video; and access a first error tolerance threshold associated with the first publisher profile in a table of error thresholds. In this implementation, in response to receiving, from a second device, in the population of devices, a third request for the first playback segment in the first rendition, the computer system can: access a second publisher profile of the first device; and select a second error tolerance threshold associated with the second publisher profile in the table of error tolerance thresholds. Therefore, the computer system can assign an error tolerance threshold to a video based on a publisher profile associated with the video, thereby regulating the quality of the video playback of the video In additional or alternative implementations, the computer system can also set the error tolerance threshold based on error history of the publisher, error history of an individual device, error history of a subpopulation of devices defined by a set of characteristics, historical viewership count (e.g., quantity of viewers) of the video, and/or type of video (e.g., advertisement, short-form content, long-form content, high-definition movie, live-stream). Furthermore, the computer system can define a dynamic error tolerance threshold, which is updated periodically based on factors such as current error rate at a device, current error rate at a subpopulation of devices defined by a set of characteristics, and/or current viewership count.

9. Error Status Derivation and Reporting

Generally, the computer system can transmit a status message to the device descriptive of the playback error and an error source responsive to classifying the playback error based on the error domain. More specifically, the computer system can transmit the status message for a single instance of the video player and can also transmit the status message for multiple instances of the video player across a population of devices. Thus, the computer system can inform a user of a device that the computer system has identified a playback error as well as the source of the playback error in order to prompt investigation of the playback error or trigger an error resolution action.

In one implementation, the computer system can transmit a status message descriptive of the playback to the device at a set time interval (e.g., once every minute, once every 20 seconds) during the video playback. More specifically, the computer system can generate a status message for the device, such as: "Device connection change identified"; "Successful playback"; "Resolution change"; "Video does not exist"; "Video's URL has expired"; "Video is not currently available"; "Video's URL is formatted incorrectly"; "Your device appears to be offline"; etc. The computer system can then transmit the message to the device, such as in real-time as the device streams and renders renditions segments of the video during video playback—in order to prompt the user to correct the error and improve playback of the video. Thus, the computer system can deliver a playback status—for both error-present and error-absent conditions at the device—to the user during the video playback.

In one implementation, the computer system can deliver a status message to the device after the video playback. More specifically, the computer system can: record a timeseries of status messages corresponding to the video playback; and transmit the timeseries of status messages to the device following completion of the video playback (e.g., once the user exits out of the video player). For example, the computer system can: record a timeseries of status messages during the video playback, each status message in the timeseries of status messages descriptive of a video playback error corresponding to a timestamp in the timeseries; and deliver the timeseries of status messages to the device (e.g., the device executing the video player) once the video playback is complete at the video player. Therefore, the computer system can reduce computational bandwidth in generating and transmitting the status messages to the device in near real-time, and can deliver the status message stream to the device once the video playback is complete descriptive of a series of playback errors and corresponding status messages during the video playback.

In one implementation, the computer system can deliver a status message to the device based on a previous content request each time the computer system receives a content request. More specifically, the computer system can generate a status message for a video playback of a set of rendition segments in response to receiving a content request for a subsequent set of rendition segments. For example, the computer system can: deliver a first video playback of first video content for a first set of rendition segments; receive a content request for a second video playback of second video content for a second set of rendition segments; and, in response to receiving the content request, generate a first status message to the device based on the first video playback. Thus, the computer system can stream status massages each time the computer system receives content requests (for subsequent rendition segments or video content) based on video playback of previously requested content. Therefore, the computer system can identify playback errors as the computer system receives content requests for additional video content.

9.1 Error Notification

In one implementation, in response to identifying an error rate of playback of a rendition segment exceeding the error tolerance threshold, the computer system can: generate a notification indicating the error rate of playback of the rendition segment; and serve this notification to the publisher of the video. Therefore, the computer system can notify the publisher of the error rate of playback of a rendition segment exceeding the error tolerance threshold. In response, the publisher may review the historic error data to identify a possible cause for the error rate.

In one implementation, in response to identifying an error rate of playback of a rendition segment exceeding the error tolerance threshold in a subpopulation of devices characterized by a set of characteristics while the error rate of playback of the rendition segment falls below the error tolerance threshold in the population of devices, the computer system can: generate a notification indicating the error rate of playback of the rendition segment within the subpopulation of devices and the set of characteristics characterizing the subpopulation of devices; and serve this notification to the publisher of the video (or to an operator of the computer system). For example, computer system can serve the notification indicating that the error rate for a first rendition segment in the first rendition exceeds the error tolerance threshold of 5% and in a subpopulation of devices that played the rendition segment via Video Player A. Therefore, the computer system can notify the publisher (or the operator) of the error rate of playback of a rendition segment exceeding the error tolerance threshold within a particular subpopulation of devices. In response, the publisher (or the operator) may review the historic error data to identify a possible cause for the error rate. For example, the publisher may identify an absence of instructions for playback of the first rendition in the Video Player A.

In another implementation, in response to error rate of playback of a rendition segment of a video exceeding the error tolerance threshold, the computer system can: derive, from the historical error data, a second error rate of playback of the video within the population of devices. Then, in response to the second error rate of playback exceeding a threshold, the computer system can: serve a notification to the publisher of the video indicating the second error rate of playback of the video exceeding the error tolerance threshold. Therefore, the computer system can notify the publisher of the video of the error rate associated with the video exceeding the error tolerance threshold. In one example, in response to this notification, the publisher may set a lower error tolerance threshold in the publisher profile.

10. Example: Dynamic Rendition Configuration

In one implementation, the computer system can detect a change from transcoding video segments into a target resolution, defined by a bitrate-resolution pair, to an alternate resolution not requested by the requesting device by a media server associated with the requesting device. For example, during a third time period, the computer system can: detect a transition from a first transcoding resolution (e.g., 720p) to a second resolution (e.g., 1080i) for a video content (e.g., a set of rendition segments) across a subset of media servers in a geographic region (e.g., city of Chicago) from the population of media servers in communication with the population of devices requesting content playback; in response to characterizing the playback error as a media server-side error, classify the error into a "resolution change domain" based on the resolution change; compute an error rate for the "resolution change domain" (e.g., 60%); detect that the error rate for the "resolution change domain" exceeds a "resolution change domain" error rate threshold; prioritize resolution of the playback error; select a target error resolution action specifying transition to the second resolution for the remainder of the video content; select the second resolution for transcoding of the video content; and stream a status message to the device indicating "Resolution is unavailable—media server error." Thus, the computer system can notify a group of users associated with the requesting devices corresponding to the malfunctioning media server that the error is attributed to a media server and the reason for the error (e.g., the reason that the computer system transitioned from the first resolution to the second resolution).

11. Low Rendition Segment Playback Error Rate in Device Population

Block S170 of the method S100 recites, during a second time period succeeding the first time period and in response to the first error rate of playback of the first rendition segment falling below a first error threshold, serving the first rendition segment to first device.

Generally, in Block S170, the computer system can release the first rendition segment to the media server for transmission to the first device after deriving a historical error rate of playback of the first rendition segment and in response to receiving a request for the first rendition segment from a first device. The first media server can then serve the first rendition segment to first device. Therefore, the computer system and the first media server can: based on historical error data collected within the population of devices during a historical time period, derive an error rate associated with the rendition segment requested; and, in response to the error rate falling below the error tolerance threshold, serve the rendition segment to the device that requested the rendition segment. Accordingly, the computer system can correlate the first rendition segment with a low error rate and release the rendition segment to the requesting device.

12. High Rendition Segment Playback Error Rate in Device Population

Blocks S165 and S180 of the method S100 recite, during the second time period and in response to receiving, from the first device, a second request for a second playback segment of the video in the first rendition: deriving, from the first set of error event records, a second error rate of playback of a second rendition segment, in the first sequence of rendition segments and corresponding to the second playback segment, within the population of devices during first time period; and, in response to the second error rate exceeding the error tolerance threshold, serving a third rendition segment, in a second sequence of rendition segments and corresponding to the second playback segment, to the first device.

Generally, in Blocks S165 and S180, the computer system can: receive the second request for the second playback segment in the first rendition; and, in response to receiving the second request, derive, from the set of historical error data, collected within the population of devices during the first time period, a second historical error rate of playback of the second rendition segment in the first rendition. Then, in response to the historical error rate associated with the second rendition segment in the first rendition exceeding the error tolerance threshold, the computer system can release a different rendition segment to the first media server for transmission to the first device. Then, the first media server can serve this rendition segment to the first device. Therefore, the computer system and the first media server can: based on historic error data collected within the population of devices during the first time period, derive an error rate associated with the rendition segment requested; and, in response to the error rate exceeding the error tolerance threshold, serve, to the device, a rendition segment that corresponds to the requested playback segment, and is in a rendition different from that which is requested. Accordingly, the computer system and the media server can identify the error rate associated with the rendition segment requested and, in response to the error rate exceeding the error tolerance threshold, mitigate the error rate by serving a different rendition segment to the device.

In one implementation, in response to the second error rate for the second rendition segment exceeding the error tolerance threshold, the computer system can select an error mitigation action including either: re-transcoding of the second rendition segment into the first rendition and releasing the re-transcoded rendition segment to the requesting device; or retrieving, from the memory, a substitute rendition segment in a different rendition and releasing the substitute rendition segment to the requesting device. In one example, the computer system can select the error mitigation action including releasing the substitute rendition segment in the second rendition to the requesting device in response to identifying a presence of the substitute rendition in the memory, the second rendition segment characterized by a second bitrate and a second resolution similar to the first bitrate and a first resolution characterizing the requested rendition. Conversely, the computer system can select the error mitigation action including re-transcoding the second rendition segment in the first rendition in response to identifying an absence of the substitute rendition segment in the memory, the substitute rendition segment characterized by a bitrate and a second resolution similar to the first bitrate and a first resolution characterizing the requested rendition. In another example, the computer system can select the error mitigation action including releasing the substitute rendition segment in the second rendition to the requesting device in response to detecting a high computational latency of the available transcode machines. Conversely, the computer system can select the error mitigation action including re-transcoding the second rendition segment in the first rendition in response to detecting a low computational latency of the available transcode machines.

Therefore, the computer system can select an error mitigation action responsive to the computational latency at the server and availability of rendition segments in order to fulfill the request for the rendition segment without introducing significant changes in bitrate and resolution and without introducing delays during the playback of the video.

In one implementation, the computer system can: receive the second request for the second rendition segment in the first rendition from a first device. Then, in response to receiving the second request and in response to the second error rate for the second rendition segment exceeding the error tolerance threshold, the computer system can: retrieve a blank error frame from the memory; and release the blank error frame to the media server for distribution to the first device. Then, the media server can serve the blank error frame to the first device in place of the second rendition segment. For example, the computer system can select this error mitigation action in response to identifying an absence of the substitute rendition segment in a similar rendition in the memory and in response to detecting a high computational latency at the available transcode machines.

12.1 Example: Generating a Replacement Rendition Segment

In one implementation, the computer system can mitigate the error associated with a rendition segment by re-transcoding this rendition segment in real-time and replacing this rendition segment with the newly re-transcoded rendition segment. In particular, after aggregating the first set of error event records for the first sequence of rendition segments within the population of devices during the first time, during a second time succeeding the first time, the computer system can: receive a request for a first playback segment of the video in the first rendition from the first device, the first rendition characterized by a first bitrate and a first resolution. In response to receiving the request, the computer system can: derive, from the first set of error event records, an error rate of playback of the first rendition segment corresponding to the first playback segment within the population of devices. Then, in response to the error rate exceeding the error tolerance threshold, the computer system can: access a first mezzanine segment, in the series of mezzanine segments, corresponding to the first playback segment of the video; transcode the first mezzanine segment into a second rendition segment in the first rendition; and release the second rendition segment to a media server for distribution to the first device.

Therefore, after receiving a request for a rendition segment, the computer system can correlate the rendition segment with an error rate exceeding the error tolerance threshold by deriving, from historic error data collected during a preceding time period within a population of devices (i.e., the first set of error data), an error rate of playback of the rendition segment. Then, in response to the error rate exceeding the error tolerance threshold, the computer system can re-transcode, in real-time, the first rendition segment by transcoding the first mezzanine segment, corresponding to the first rendition segment, into a new rendition segment. Then, the computer system can release the new rendition segment to a media server for distribution to the requesting device, which generated the first request, and replace the rendition segment with the new rendition segment in a rendition cache, where rendition segments are stored for later access and distribution to requesting devices. Thus, the computer system can access the new rendition segment in the rendition cache during a subsequent time period. Accordingly, the computer system can: mitigate a high error rate associated with the rendition segment by generating a replacement rendition segment in the same rendition as the rendition of the rendition segment associated with the high error rate; and substitute the rendition segment associated with the high error rate with the replacement rendition segment.

In an alternative implementation, the computer system can mitigate the error associated with a particular rendition segment by replacing the rendition segment associated with the error with a different rendition segment, transcoded in-real time by the computer system, in response to receiving the request for the rendition segment and prior to serving the rendition segment to the device. In particular, after aggregating the first set of error event records for the first sequence of rendition segments within the population of devices, the computer system can: in response to receiving a request for a first playback segment of the video in the first rendition from the first device, the first rendition characterized by a first bitrate and a first resolution, derive, from the first set of error event records, an error rate of playback of the first rendition segment corresponding to the first playback segment within the population of devices. Then, in response to the error rate exceeding the error tolerance threshold, the computer system can: access a first mezzanine segment, in the series of mezzanine segments, corresponding to the first playback segment of the video; transcode the first mezzanine segment into a second rendition segment in a second rendition characterized by a second bitrate and a second resolution; and release the second rendition segment to a media server for distribution to the first device. For example, the computer system can transcode the first mezzanine segment into a second rendition segment in the second rendition characterized by the second bitrate and the second resolution lower than the first bitrate and the first resolution in response to receiving a set of playback data from a player of the first device, the set of playback data indicating a high level of latency during the playback of the video at the first device.

Therefore, after receiving a request for a rendition segment, the computer system can correlate the rendition segment with an error rate exceeding an error tolerance threshold by deriving, from historic error data collected during an earlier time period in a population of devices, an error rate of playback of the rendition segment within the population of devices. The computer system can also access playback data from the first device and, in response to the playback data indicating a low (e.g., lower than expected, lower than a threshold) playback quality of the video at the first device, transcode, in real-time, a new rendition segment in a second rendition characterized by a lower bitrate and resolution than the bitrate and resolution defining the requested rendition. Accordingly, the computer system can mitigate a high error rate associated with the rendition segment by generating a new rendition segment in real-time and substituting the rendition segment associated with the high error rate with the new rendition segment.

12.2 Example: On-Demand Re-transcode of Replacement Rendition Segments

In one implementation, the computer system can generate a rendition segment in response to receiving a request for the rendition segment from a device. After generating the rendition segment, the computer system can store the rendition segment in a rendition cache. Upon receiving a second request for the rendition segment, the computer system can: access the rendition segment in the rendition cache; and release the first rendition segment to a media server for distribution to the requesting device. However, the computer system can also delete the rendition segment from the rendition cache in response to a frequency of requests for the rendition segment falling below a threshold. For example, the computer system can derive an error rate associated with the rendition segment from historic error data in response to an absence of the rendition segment in the cache if the rendition segment has been previously served to the population of devices.

In this implementation, the computer system can: segment the video into a sequence of mezzanine segments, each mezzanine segment in the sequence of mezzanine segments including a playback segment of the video; and prior to transcoding the video into the third rendition, publish the manifest file for distribution to the population of devices, the manifest defining a third rendition of the audio-video file characterized by a third bitrate and a third resolution. Therefore, the computer system can publish the manifest specifying renditions of the video available to be requested by the population of devices.

Then, in response to receiving a third request for a third playback segment in the third rendition from the first device during the second time period and in response to identifying absence of the third playback segment in the third rendition from the rendition cache, the computer system can access a third set of error records of playbacks of the video within a population of devices during a first time period. Then, in response to a failure to derive a third error rate of playback of a third rendition segment based on the third set of error event records, the computer system can: transcode a third mezzanine segment corresponding to the third playback segment into a third rendition segment in the third rendition; and release the third rendition segment to a media server for distribution to the first device.

Therefore, in response to receiving a request for the third rendition segment from the first device, the computer system can attempt to derive the error rate for the third rendition segment from historical error data. However, in response to an absence of the error rate for the third rendition segment from historical error data and in response to the absence of the third rendition segment in the rendition cache, the computer system can generate the third rendition segment.

In this implementation, during a third time period succeeding the second time period, in response to receiving a fourth request for a third playback segment in the third rendition from a second device, the computer system can: access a fourth set of error records of playbacks of the third rendition segment at the first device during the second time period; derive a fourth error rate of playback of the third rendition segment; and, in response to the first error tolerance threshold exceeding the third error rate, serving the third rendition segment to the second device. Therefore, after generating the third rendition segment for the first time, the computer system and a media server can: access the error data for the third rendition segment; and, in response to the error rate associated with the third rendition segment falling below the error tolerance threshold, serve the third rendition segment to a requesting device.

12.3 Example: Scheduled Transcoding of Replacement Rendition Segments

In this implementation, the computer system can transcode or re-transcode the rendition segment or the video following the request for the rendition segment. For example, the computer system can: queue transcode or re-transcode of the rendition segment or the video following reception of the request; and execute the transcode or re-transcode in response to identifying available transcode machines and/or detecting computational bandwidth of the available transcode machines. In this implementation, in response to the error rate of playback of the second rendition segment exceeding the first error tolerance threshold, the computer system can: temporarily replace the second rendition segment in the first rendition with a third rendition segment in the second rendition. Then, the computer system can: queue re-transcoding of the second rendition segment in the first rendition; or queue re-transcoding of the first sequence of rendition segments in the first rendition.

In this implementation, in response to the second error rate of playback of the second rendition segment exceeding the first error tolerance threshold, the computer system can: release a third rendition segment, in a second sequence of rendition segments and corresponding to the second playback segment, to a media server for distribution to the first device; temporarily replace the second rendition segment with the third rendition segment in the first sequence of rendition segments; and queue re-transcoding the video into a third sequence of rendition segments in the second rendition characterized by the second resolution and the second bitrate. Then, in response to receiving, from a second device, a third request for the second playback segment in the second rendition at a third time period subsequent the second time period, the media server can serve a fourth rendition segment, in third sequence of rendition segments and corresponding to the second playback segment of the video, to the second device.

Therefore, the computer system can mitigate the errors associated with the second rendition segment by queuing re-transcode of the second rendition segment; and re-transcoding the second rendition segment in response to detecting a low latency of the transcode machines.

13. Correlating High Error Rate with Device Characteristics

Generally, the computer system can correlate certain devices in the population of devices with elevated error rates of playback of a rendition segment based on the device characteristics of these devices, the device characteristics including operating system type, region, video player type, browser type, and/or identifier of an associated media server. For example, a first subset of devices characterized by a first operating system type can exhibit a first error rate of playback of a first rendition segment, while a second subset of devices characterized by a second operating system type can exhibit a second error rate, lower than the first error rate, of playback of the first rendition segment.

In one implementation, in response to receiving a request for a rendition segment from a second device, the computer system can identify a first error rate of playback of the rendition segment within a subpopulation of devices defined by a characteristic of the second device. In this implementation, the computer system can release the rendition segment to the media server for distribution to the second device in response to the first error rate of the rendition segment within this subpopulation of devices falling below the error tolerance threshold. Furthermore, the computer system can release the rendition segment to the media server despite a second error rate of playback the rendition segment within the population of devices exceeding the error tolerance threshold.

In this implementation, during the second time period, the computer system can: receive, from a first device, a first request for a second playback segment of the video in the first rendition; derive, from the first set of error event records, a first error rate of playback of a second rendition segment, in the first rendition and corresponding to the second playback segment, within the population of devices during the first time period; and, in response to first error rate exceeding the first error tolerance threshold, release a third rendition segment, in a first rendition and corresponding to the second playback segment, to a media server for distribution to the first device. In this implementation, during a third time period succeeding the second time period, in response to receiving, from a second device, a second request for the second playback segment in the first rendition, the computer system can: access a set of characteristics of the second device, the set of characteristics including operating system type of the first device, region of the first device, video player type of the first device, browser type of the first device, and/or identifier of a media server serving the first device; define a subpopulation of devices in the population of devices, the subpopulation of devices characterized by the set of characteristics; derive, from the first set of error event records, a second error rate of playback of the second rendition segment within the subpopulation of devices during first time period; and, in response to the first error tolerance threshold exceeding the second error rate, release the second rendition segment, in the first rendition and corresponding to the second playback segment of the video, to the media server for distribution to the second device.

Therefore, the computer system can access an error rate of playback of a rendition segment within a subpopulation of devices defined by a set of characteristics of a device requesting the rendition segment. Thus, when deriving the error rate associated with the rendition segment, the computer system can exclude from consideration error rates collected within devices characterized by a set of characteristics different from the set of characteristics of the requesting device, as these error rates may not be predictive of the error rate of playback of the rendition segment at the requesting device.

In another implementation, in response to receiving a request for a rendition segment in a first rendition from a device, in the population of devices, the computer system and a media server can: identify the error rate of playback of the rendition segment within a subpopulation of devices exhibiting characteristics of the device; and, in response to the error rate exceeding the error tolerance threshold, mitigate the error associated with the rendition segment by serving a different rendition segment to the device.

In this implementation, in response to receiving, from the first device, a second request for a second playback segment of the video in the first rendition during the second time period, the computer system can: access a set of characteristics of the first device, the set of characteristics including operating system type of the first device, region of the first device, video player type of the first device, browser type of the first device, and/or identifier of a media server servicing the first device; define a subpopulation of devices in the population of devices, the subpopulation of devices characterized by the set of characteristics; and derive, from the first set of error event records collected within the subpopulation of devices during the first time period preceding the second time period, a third error rate of playback of the second rendition segment. Then, in response to the third error rate exceeding the first error tolerance threshold, the media server can serve the second rendition segment, in the first rendition and corresponding to the second playback segment of the video, to the second device.

Therefore, the computer system can access an error rate of playback of a rendition segment within a subpopulation of devices that exhibit a set of characteristics of a requesting device, which has requested the rendition segment. The computer system can derive an error rate of playback of the rendition segment more predictive of possible errors during playback of the rendition segment at the requesting device by deriving the error rate of playback of the rendition segment within the subpopulation of devices defined by characteristics of the requesting device. Accordingly, the computer system can improve error prediction/detection and make error mitigation more effective by: deriving the error rate of playback of the rendition segment within the subpopulation of devices defined by characteristics of the requesting device; and substituting the rendition segment with a different rendition segment in response to the error rate exceeding the error tolerance threshold.

14. Correlating High Error Rate with Media Server

In one implementation, the computer system can assess error rate associated with a rendition based on the sequence of rendition segment playback requests for the sequence of rendition segments in the rendition. For example, in the absence of an increased error rate during playback of the sequence of the rendition segments of a video within a population of devices, the sequence of rendition segment playback requests can generally be characterized by a low variability. In particular, a media server can receive the playback requests in the sequence of rendition segment playback requests at regular intervals. However, in the presence of an increased error rate during playback of the sequence of the rendition segments of a video within a population of devices, the sequence of rendition segment playback requests can exhibit high variability. In particular, a media server can receive the playback requests in the sequence of rendition segment playback requests at irregular intervals indicating that errors are occurring during playback of the rendition segments. More specifically, due to the errors occurring during playback of rendition segments, a video player can request the rendition segments at irregular intervals.

In this implementation, the computer system can access the first set of error records of playbacks of the first sequence of rendition segments (e.g., segments of the video in the first rendition) within the population of devices during the first time period by: accessing, from a population of media servers serving the population of devices, a first series of playback requests for the first sequence of rendition segments received at the population of media servers from the population of devices. For example, the first series of playback requests can include a timeseries of requests for the first sequence of rendition segments in the first rendition received at the media server. Similarly, the computer system can access a second set of error records of playbacks of the second sequence of rendition segments (e.g., segments of the video in the second rendition) within the population of devices during the first time period by: accessing, from a population of media servers serving the population of devices, a second series of playback requests for the second sequence of rendition segments received at the population of media servers from the population of devices.

Then, the computer system can, based on the first series of playback requests, identify a first variability in a first cadence of request intervals for the first sequence of rendition segments. For example, the computer system can: transform the first series of playback requests into a first distribution of request intervals for the first sequence of rendition segments within the population of devices; and derive a first variance of the first distribution request intervals, indicative of the first variability. The computer system can also, based on the second series of playback requests, identify a second variability in a second cadence of request intervals for the second sequence of rendition segments. For example, the computer system can: transform the second series of playback requests into a second distribution of request intervals for the second sequence of rendition segments within the population of devices; and derive a second variance of the second distribution request intervals. Then, in response to receiving, from a device, a request for a third playback segment of the video in the first rendition and in response to the second variance exceeding the first variance, a media server can serve a fourth rendition segment, in the second rendition and corresponding to the third playback segment, to the second device. Thus, the computer system can estimate the error rate associated with one rendition of the video based on the variability.

In one implementation, the computer system and/or a particular media server can receive error data from multiple media servers. For example, a first media server can access the first set of error records of playbacks of the first rendition segment within a population of devices during a first time period by: accessing a first subset of error records of playbacks of the first rendition within a first population of devices served by the first media server during the first time period; accessing a second subset of error records of playbacks of a first rendition segment within a second population of devices served by a second media server during a first time period; and aggregating the first subset of error event records and the second subset of error event records into the first set of error event records. The first media server can then transmit the first set of error event records to the computer system. Therefore, the computer system and/or the first media server can access historical error rate data for the first playback segment of the video from several media servers. Similarly, the computer system of the first media server can access historical error rate data for the first rendition segment from multiple video players and/or from each device within the population of devices. Therefore, the computer system can aggregate historical error data across multiple devices and multiple media servers.

15. Mitigation of Media Server-Associated Errors

Generally, the computer system can: based on historical error data, derive a first error rate of playback of a rendition segment within a subpopulation of devices served by a particular media server within a population of media servers; and, based on historical error data, derive a second error rate of playback of the rendition segment within the population of devices served by a population of media servers. Then, in response to the first error rate exceeding the second error rate and/or based on the first error rate exceeding the error tolerance threshold, the computer system can mitigate the error by routing the rendition segment to a requesting device though a different media server, within the population of media servers.

In this implementation, after receiving the first request for the first playback segment in the first rendition from the first device during the second time period, the computer system can: identify a first media server serving the first device; define a subpopulation of devices, in the population of devices, served by the first media server; and derive, from the first set of error event records, a third error rate of playback of the first rendition segment within the subpopulation of devices during the first time period preceding the second time period. Then, in response to the third error rate exceeding the error tolerance threshold, the computer system can: release the first rendition segment, corresponding to the first playback segment of the video, to a second media server for distribution to the first device.

Therefore, the computer system can: receive a request for the first playback segment from the first device served by the first media server; derive the third error rate of playback of the first rendition segment within the subpopulation of devices served by the first media server; and, in response to the third error rate exceeding the error tolerance threshold, serve the first playback segment to the first device via a second media server. Additionally, or alternatively, in response to a difference between the third error rate and the first error rate exceeding a threshold difference, the computer system can release the first playback segment to the second media server for distribution to the first device. Accordingly, the computer system can mitigate increased error rate associated with rendition segments playing at the first media server by routing the rendition segments to the first device though a second media server.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
ingesting a video;
transcoding the video into a first sequence of rendition segments in a first rendition characterized by a first resolution and a first bitrate;
transcoding the video into a second sequence of rendition segments in a second rendition characterized by a second resolution and a second bitrate;
accessing a first set of error records of playbacks of the first sequence of rendition segments within a population of devices during a first time period; and
during a second time period succeeding the first time period:
in response to receiving, from a first device, a first request for a first playback segment of the video in the first rendition:
deriving, from the first set of error event records, a first error rate of playback of a first rendition segment, in the first rendition and corresponding to the first playback segment, within the population of devices during the first time period; and
in response to the first error rate falling below a first error tolerance threshold, serving the first rendition segment to the first device; and
in response to receiving, from the first device, a second request for a second playback segment of the video in the first rendition:
deriving, from the first set of error event records, a second error rate of playback of a second rendition segment, in the first rendition and corresponding to the second playback segment, within the population of devices during the first time period; and
in response to the second error rate exceeding the first error tolerance threshold, serving a third rendition segment, in the second rendition and corresponding to the second playback segment, to the first device.

2. The method of claim 1, further comprising:
during the second time period:
segmenting the video into a series of mezzanine segments, each mezzanine segment in the series of mezzanine segments corresponding to a playback segment of the video; and
in response to receiving, from the first device, a third request for a third playback segment of the video in the first rendition:
deriving, from the first set of error event records, a third error rate of playback of a fourth rendition segment, in the first rendition and corresponding to the third playback segment, within the population of devices during the first time period; and
in response to the third error rate exceeding the first error tolerance threshold:
accessing a first mezzanine segment, in the series of mezzanine segments, corresponding to the third playback segment;
transcoding the first mezzanine segment into a fifth rendition segment in a third rendition characterized by a third bitrate and a third resolution lower than the first bitrate and the first resolution; and
serving the fifth rendition segment to the first device.

3. The method of claim 1, further comprising:
during the second time period:
segmenting the video into a series of mezzanine segments, each mezzanine segment in the series of mezzanine segments corresponding to a playback segment of the video; and
in response to receiving, from the first device, a third request for a third playback segment of the video in the first rendition:
deriving, from the first set of error event records, a third error rate of playback of a fourth rendition segment, in the first rendition and corresponding to the third playback segment, within the population of devices during the first time period; and
in response to the third error rate exceeding the first error tolerance threshold:
accessing a first mezzanine segment, in the series of mezzanine segments, corresponding to the third playback segment of the video;
re-transcoding the first mezzanine segment, in the series of mezzanine segments, into a fifth rendition segment in the first rendition; and
serving the fifth rendition segment to the first device.

4. The method of claim 1, further comprising:
during the second time period:
in response to receiving, from a second device, a third request for the second playback segment in the first rendition:
accessing a set of characteristics of the second device, the set of characteristics comprising operating system type of the second device, region of the second device, video player type of the second device, or browser type of the second device;
defining a subpopulation of devices, in the population of devices, characterized by the set of characteristics;
deriving, from the first set of error event records, a third error rate of playback of the second rendition segment, in the first rendition and corresponding to the second playback segment, within the subpopulation of devices during the first time period; and
in response to the first error tolerance threshold exceeding the third error rate, serving the second rendition segment to the second device.

5. The method of claim 1:
further comprising:
during the second time period:
in response to receiving, from the first device, the second request for the second playback segment of the video in the first rendition:
accessing a set of characteristics of the first device, the set of characteristics comprising operating system type of the first device, region of the first device, video player type of the first device, or browser type of the first device;
defining a subpopulation of devices, in the population of devices, characterized by the set of characteristics; and
deriving, from the first set of error event records, a third error rate of playback of the second rendition segment, in the first rendition and corresponding to the second playback segment, within the subpopulation of devices during the first time period; and wherein serving the third rendition segment, in the second rendition and corresponding to the second playback segment, to the first device comprises:
in response to the third error rate exceeding the first error tolerance threshold, serving the third rendition segment to the first device.

6. The method of claim 5, further comprising:
in response to the third error rate exceeding the first error tolerance threshold:
generating a notification indicating the third error rate for playback of the second rendition segment within the subpopulation of devices exceeding the first error tolerance threshold, the subpopulation of devices characterized by the set of characteristics; and
serving the notification to a publisher of the video.

7. The method of claim 1:
wherein accessing the first set of error event records comprises:
for each device in the population of devices:
accessing, from a video player of the device, a playback error stream comprising a sequence of playback errors occurring during playback of the first sequence of rendition segments at the video player; and
aggregating the playback error stream into the first set of error event records; and
wherein deriving, from the first set of error event records, the first error rate of the first rendition segment comprises:
based on the first set of error event records, deriving a first subset of error event records of playbacks of the first rendition segment within the population of devices during the first time period; and
calculating a first error rate based on a quantity of errors in the first subset of error event records, duration of the first playback segment, and a quantity of devices in the population of devices.

8. The method of claim 1:
wherein accessing the first set of error event records comprises:
for each device in the population of devices:
accessing, from a media server servicing the device, a playback error stream comprising a series of rendition segment playback requests for the first sequence of rendition segments recorded at the media server; and
aggregating the playback error streams into the first set of error event records; and
wherein deriving, from the first set of error event records, the first error rate of the first rendition segment comprises:
deriving a first playback request interval associated with the first rendition segment from the first set of error event records, the first playback request interval defining an average interval between a first request time for the first rendition segment and a second request time for a subsequent rendition segment within the population of devices; and
approximating the first error rate based on the first playback request interval.

9. The method of claim 1:
wherein accessing the first set of error event records comprises:
during the first time period:
accessing a first series of rendition segment playback requests for the first sequence of rendition segments received at a population of media servers;
further comprising:
during the first time period:
accessing a second series of rendition segment playback requests for the second sequence of rendition segments received at the population of media servers; and
during the second time period:
based on the first series of rendition segment playback requests, identifying a first variability in a first cadence of request intervals for the first sequence of rendition segments;
based on the second series of rendition segment playback requests, identifying a second variability in a second cadence of request intervals for the second sequence of rendition segments; and
in response to receiving, from a second device, a third request for a third playback segment of the video in the first rendition and in response to the second variability exceeding the first variability:
serving a fourth rendition segment, in the second rendition and corresponding to the third playback segment, to the second device.

10. The method of claim 1, further comprising:
during the second time period:
in response to receiving, from the first device, the first request for the first playback segment in the first rendition:
accessing a first characteristic of the first device; and
selecting the first error tolerance threshold associated with the first characteristic in a table of error thresholds; and
in response to receiving, from a second device, in the population of devices, a third request for the first playback segment in the first rendition:
accessing a second characteristic of the second device; and
selecting a second error tolerance threshold associated with the second characteristic in the table of error thresholds.

11. The method of claim 1, further comprising:
during the second time period:
in response to receiving, from the first device, the first request for the first rendition segment in the first rendition:
accessing a first publisher profile associated with the video; and
accessing the first error tolerance threshold associated with the first publisher profile in a table of error thresholds; and
in response to receiving, from a second device, in the population of devices, a third request for the first playback segment in the first rendition:
accessing a second publisher profile of the second device; and
selecting a second error tolerance threshold associated with the second publisher profile in the table of error thresholds.

12. The method of claim 1, further comprising:
segmenting the video into a sequence of mezzanine segments, each mezzanine segment in the sequence of mezzanine segments comprising a playback segment of the video;
prior to transcoding the video into a third rendition, publishing a manifest file for distribution to the population of devices, the manifest file defining:

the third rendition characterized by a third bitrate and a third resolution; and
in response to receiving a third request for a third playback segment in the third rendition from the first device during the second time period and in response to identifying absence of the third playback segment in the third rendition in a rendition cache:
 accessing a third set of error records of playbacks of the video within the population of devices during the first time period; and
 in response to a failure to obtain, from the third set of error event records, a third error rate of playback of a third rendition segment:
  transcoding a third mezzanine segment corresponding to the third playback segment into a fourth rendition segment in the third rendition; and
  serving the fourth rendition segment to the first device.

13. The method of claim 12, further comprising:
in response to receiving a fourth request for the third playback segment in the third rendition from a second device:
 accessing a fourth error rate occurring during playback of the fourth rendition segment at the first device during the second time period; and
 in response to the first error tolerance threshold exceeding the fourth error rate, serving the fourth rendition segment to the second device.

14. The method of claim 1, further comprising:
in response to the second error rate of playback of the second rendition segment exceeding the first error tolerance threshold:
 temporarily replacing the second rendition segment with the third rendition segment in the first sequence of rendition segments; and
 re-transcoding the video into a third sequence of rendition segments in the first rendition characterized by the first resolution and the first bitrate; and
in response to receiving, from a second device, a third request for the second playback segment in the first rendition:
 serving a fourth rendition segment, in the third sequence of rendition segments and corresponding to the second playback segment of the video, to the second device.

15. The method of claim 1:
further comprising:
 during the second time period:
  in response to receiving the first request:
   identifying a first media server serving the first device;
   defining a subpopulation of devices, in the population of devices, served by the first media server; and
   deriving, from the first set of error event records, a third error rate of playback of the first rendition segment within the subpopulation of devices during the first time period; and
wherein serving the first rendition segment to the first device comprises:
 in response to the third error rate exceeding the first error tolerance threshold, serving the first rendition segment, in the first sequence of rendition segments and corresponding to the first playback segment of the video, to the first device via a second media server.

16. A method comprising:
ingesting a video;
transcoding the video into a first sequence of rendition segments in a first rendition characterized by a first resolution and a first bitrate;
accessing a first set of error records of playbacks of the first sequence of rendition segments within a population of devices during a first time period; and
during a second time period succeeding the first time period:
 in response to receiving, from a first device, a first request for a first playback segment of the video in the first rendition:
  deriving, from the first set of error event records, a first error rate of playback of a first rendition segment, in the first rendition and corresponding to the first playback segment, within the population of devices during the first time period; and
  in response to the first error rate falling below a first error tolerance threshold;
   assigning the first device to a first media server; and
   releasing the first rendition segment the first media server for transmission to the first device; and
 in response to receiving, from the first device, a second request for a second playback segment of the video in the first rendition:
  deriving, from the first set of error event records, a second error rate of playback of a second rendition segment, in the first rendition and corresponding to the second playback segment, within the population of devices during the first time period; and
  in response to the second error rate exceeding the first error tolerance threshold:
   assigning the second playback segment to a first worker for re-transcoding into the first rendition;
   accessing a third rendition segment corresponding to the second playback segment in the first rendition from the first worker;
   releasing the third rendition segment to the first media server for transmission to the first device; and
   replacing the first rendition segment with the third rendition segment in the first sequence of rendition segments.

17. The method of claim 16, further comprising:
during the second time period:
 in response to receiving, from the first device, the first request for the first rendition segment in the first rendition:
  accessing a first publisher profile associated with the video; and
  accessing the first error tolerance threshold associated with the first publisher profile in a table of error thresholds.

18. The method of claim 16, further comprising:
in response to receiving, from the first device, a third request for a third playback segment of the video in the first rendition:
 deriving, from the first set of error event records, a third error rate of playback of a third rendition segment, in the first rendition and corresponding to the third playback segment, within the population of devices during the first time period;
 in response to the third error rate exceeding the first error tolerance threshold:

defining a subpopulation of devices in the population of devices, the subpopulation of devices served by the first media server; and deriving, from the first set of error event records, a fourth error rate of playback of the third rendition segment within the subpopulation of devices during the first time period; and in response to the fourth error rate exceeding the first error tolerance threshold, releasing a fourth rendition segment corresponding to the third playback segment to a second media server for transmission to the first device.

19. A method comprising:

during a first time period:
- serving a first sequence of rendition segments in a first rendition characterized by a first resolution and a first bitrate to a first population of devices;
- accessing a first set of error records of playbacks of a first rendition segment, in the first sequence of rendition segments and corresponding to the first playback segment in the first rendition, within the population of devices during a first time period; and
- accessing a second set of error records of playbacks of a second rendition segment, in the first sequence of rendition segments and corresponding to the second playback segment in the first rendition, within the population of devices during the first time period;

during a second time period:
- in response to receiving, from a first device, a first request for the first rendition segment:
  - deriving, from the first set of error event records, a first error rate of playback of the first rendition segment; and
  - in response to the first error rate falling below a first error tolerance threshold, serving the first rendition segment to the first device; and
- in response to receiving, from the first device, a second request for the second rendition segment:
  - deriving, from the second set of error event records, a second error rate of playback of the second rendition segment; and
  - in response to the second error rate exceeding the first error tolerance threshold:
    - accessing a third rendition segment, corresponding to the second playback segment, in a second rendition from a server; and
    - serving the third rendition segment to the first device.

20. The method of claim 19:

wherein accessing the first set of error records of playbacks of the first rendition segment corresponding to the first playback segment in the first rendition within a population of devices during the first time period preceding the second time period comprises:

at a first media server:
- accessing a first subset of error records of playbacks of the first rendition segment corresponding to the first playback segment in the first rendition within a first population of devices served by the first media server during the first time period;
- accessing a second subset of error records of playbacks of the first rendition segment corresponding to the first playback segment in the first rendition within a second population of devices served by a second media server during the first time period; and
- aggregating the first subset of error event records and the second subset of error event records into the first set of error event records.

* * * * *